US012744372B2

(12) United States Patent
Gao et al.

(10) Patent No.: US 12,744,372 B2

(45) Date of Patent: Sep. 22, 2026

(54) POWER SUPPLY SYSTEM, POWER CONDITIONING APPARATUS, AND POWER CONDITIONING SYSTEM

(71) Applicant: Huawei Digital Power Technologies Co., Ltd., Shenzhen (CN)

(72) Inventors: Yongbing Gao, Shanghai (CN); Xiaoxiang Zhou, Shanghai (CN); Junsong Tang, Shanghai (CN); Zhuang Sun, Shanghai (CN); Wangjie Xie, Shanghai (CN); Yong Xu, Shanghai (CN); Tao Shi, Shanghai (CN); He Zhou, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 137 days.

(21) Appl. No.: 18/917,734

(22) Filed: Oct. 16, 2024

(65) Prior Publication Data

US 2025/0158386 A1 May 15, 2025

(30) Foreign Application Priority Data

Nov. 15, 2023 (CN) ......................... 202311524542.4

(51) Int. Cl.

*H02H 3/26* (2006.01)
*H02J 3/0012* (2026.01)
*H02J 3/007* (2026.01)

(52) U.S. Cl.

CPC ............ *H02H 3/26* (2013.01); *H02J 3/0012* (2020.01); *H02J 3/007* (2020.01)

(58) Field of Classification Search

CPC .......... H02H 3/26; H02H 7/20; H02H 11/001; H02H 7/122; H02J 3/0012; H02J 3/007;

(Continued)

(56) References Cited

U.S. PATENT DOCUMENTS 4,198,628 A * 4/1980 Laber ..................... H02H 3/353 340/650
4,525,764 A * 6/1985 Titus ........................ H02H 3/14 361/48

(Continued)

FOREIGN PATENT DOCUMENTS

CN 107328981 B 1/2020
CN 116626547 A 8/2023

*Primary Examiner* — Dharti H Patel

(74) *Attorney, Agent, or Firm* — Maier & Maier, PLLC

(57) ABSTRACT

A power supply system includes a power conditioning apparatus, a transformer, and a controller. The power conditioning apparatus includes an inverter circuit, at least one grid-connected switch, a voltage-to-ground detector. The inverter circuit is configured to connect to the inverter circuit is configured to connect to the transformer through the at least one grid-connected switch, and the transformer is configured to connect to a power grid. When one grid-connected switch is turned off and turned on, the voltage-to-ground detector detects voltage to grounds of the power conditioning apparatus to obtain a first voltage value and a second voltage value respectively. The controller outputs alarm information for grounding of a neutral wire of the transformer or controls the power conditioning apparatus to stop working when a difference between the second voltage value and the first voltage value falls within a preset voltage range.

20 Claims, 19 Drawing Sheets

(58) Field of Classification Search
CPC ...... H02J 3/381; H02J 2101/24; G01R 31/52; H02M 1/007; H02M 1/32; H02M 7/48
See application file for complete search history.

(56) References Cited

U.S. PATENT DOCUMENTS

| | | | | |
|---|---|---|---|---|
| 6,504,691 | B1 * | 1/2003 | Matsui | H05B 41/2851 361/45 |
| 2012/0026631 | A1 * | 2/2012 | Kazemi | H02H 3/16 361/42 |
| 2018/0259563 | A1 * | 9/2018 | Tsubota | H02H 3/14 |
| 2023/0344239 | A1 * | 10/2023 | Zhang | H02J 3/381 |
| 2023/0393179 | A1 * | 12/2023 | Putz | G01R 27/025 |
| 2024/0022072 | A1 * | 1/2024 | Yu | H02J 3/381 |

* cited by examiner

--Prior Art--

POWER SUPPLY SYSTEM, POWER CONDITIONING APPARATUS, AND POWER CONDITIONING SYSTEM

CROSS-REFERENCE OF RELATED APPLICATION

This application claims priority to Chinese Patent Application No. 202311524542.4, filed on Nov. 15, 2023, the disclosure of which is hereby incorporated by reference in its entirety.

TECHNICAL FIELD

The embodiments relate to the field of power supply technologies and to a power supply system, a power conditioning apparatus, and a power conditioning system.

BACKGROUND

In a process of installing a photovoltaic system shown in FIG. 1, an operator may mistakenly connect a neutral N wire of a transformer in the photovoltaic system to a reference ground PE, incurring a risk of damage to the photovoltaic system in a running process. Specifically, in a case in which the neutral N wire of the transformer is connected to the reference ground PE, after a short circuit to ground occurs in a power transmission path of the photovoltaic system (for example, a power transmission path formed by a photovoltaic string, an inverter, and a transformer shown in FIG. 1), for example, a short circuit to ground occurs in the photovoltaic string, and a relay inside the inverter is turned on, a large fault current is generated in the power transmission path, and the fault current may damage a circuit in the power transmission path, for example, the inverter. Therefore, how to detect a status of connection between the neutral N wire of the transformer and the reference ground PE, and take a protection measure in time when it is detected that the neutral N wire of the transformer is connected to the reference ground PE is particularly important.

SUMMARY

The embodiments provide a power supply system, a power conditioning apparatus, and a power conditioning system. This can effectively determine a status of connection between a neutral wire of a transformer and a reference ground, and take a protection measure in time when the neutral wire of the transformer is grounded, to improve reliability of the power supply system.

According to a first aspect, the embodiments provide a power supply system. The power supply system includes a power conditioning apparatus, a transformer, and a controller. The power conditioning apparatus includes a direct current input end, an inverter circuit, at least one grid-connected switch, a voltage-to-ground detector, and at least one alternating current output end. The direct current input end of the power conditioning apparatus is configured to connect to a direct current source. An end of the inverter circuit is configured to connect to the direct current input end, and another end of the inverter circuit is configured to connect to the at least one alternating current output end of the power conditioning apparatus through the at least one grid-connected switch. The at least one alternating current output end of the power conditioning apparatus is configured to connect to an input end of the transformer, and an output end of the transformer is configured to connect to a power grid. When one of the at least one grid-connected switch is turned off, the voltage-to-ground detector detects a voltage to ground of the power conditioning apparatus to obtain a first voltage value; and when the grid-connected switch is turned on, the voltage-to-ground detector detects the voltage to ground of the power conditioning apparatus to obtain a second voltage value. Then the controller outputs alarm information for grounding of a neutral wire of the transformer or controls the power conditioning apparatus to stop working when a difference between the second voltage value and the first voltage value falls within a preset voltage range.

In this implementation, a difference that is between the second voltage value and the first voltage value and that exists when the neutral wire of the transformer is grounded varies greatly from a difference that is between the second voltage value and the first voltage value and that exists when the neutral wire of the transformer is not grounded. Therefore, the power supply system can effectively determine, based on a magnitude relationship between two voltage to ground values that are of the power conditioning apparatus and that are obtained by the voltage-to-ground detector through detection before and after an action of the grid-connected switch (for example, a first grid-connected switch), whether the neutral wire of the transformer is grounded. This detection manner is simple and helps improve detection efficiency. In addition, when the neutral wire of the transformer is grounded, the power conditioning apparatus outputs the alarm information for grounding of the neutral wire of the transformer or stops working, to prompt an operator to check for a neutral wire grounding fault of the transformer in time to ensure that the neutral wire of the transformer is no longer grounded. This can avoid a case in which a fault current damages a device due to grounding of the neutral wire of the transformer when a short circuit to ground occurs in a power transmission path on which the power conditioning apparatus is located, to improve reliability of the power conditioning apparatus and therefore improve reliability of the power supply system.

With reference to the first aspect, in a first possible implementation, the voltage-to-ground detector is connected between a reference ground and the another end of the inverter circuit connected to the grid-connected switch. When the difference between the second voltage value and the first voltage value is greater than a first voltage threshold, the controller outputs the alarm information for grounding of the neutral wire of the transformer or controls the power conditioning apparatus to stop working.

In this implementation, the power supply system can determine, based on a magnitude relationship between two voltage to ground values that are of the another end of the inverter circuit connected to the first grid-connected switch and that are obtained by the voltage-to-ground detector through detection before and after an action of the first grid-connected switch, whether the neutral wire of the transformer is grounded. This detection manner is simple and helps improve detection efficiency. In addition, when the neutral wire of the transformer is grounded, the power conditioning apparatus outputs the alarm information for grounding of the neutral wire of the transformer or stops working, to prompt the operator to check for the neutral wire grounding fault of the transformer in time to ensure that the neutral wire of the transformer is no longer grounded. In this way, the reliability of the power conditioning apparatus can be improved. Therefore, the reliability of the power supply system is improved.

With reference to the first aspect, in a second possible implementation, the voltage-to-ground detector is connected between a reference ground and one alternating current output end connected to the grid-connected switch. When the difference between the second voltage value and the first voltage value is less than a second voltage threshold, the controller outputs the alarm information for grounding of the neutral wire of the transformer or controls the power conditioning apparatus to stop working.

In this implementation, a position of the voltage-to-ground detector changes from a left side of the first grid-connected switch to a right side. A detection manner in which the power supply system detects, when the voltage-to-ground detector is located on the right side of the first grid-connected switch, whether the neutral wire of the transformer is grounded is opposite to a detection manner in which the power supply system detects, when the voltage-to-ground detector is located on the left side of the first grid-connected switch, whether the neutral wire of the transformer is grounded. There are various detection manners of the power supply system, and flexibility is high. In addition, when the neutral wire of the transformer is grounded, the power conditioning apparatus outputs the alarm information for grounding of the neutral wire of the transformer or stops working, to prompt the operator to check for the neutral wire grounding fault of the transformer in time to ensure that the neutral wire of the transformer is no longer grounded. In this way, the reliability of the power conditioning apparatus can be improved. Therefore, the reliability of the power supply system is improved.

With reference to the first aspect, in a third possible implementation, the power conditioning apparatus further includes a direct current bus. The end of the inverter circuit is connected to the direct current input end of the power conditioning apparatus through the direct current bus. The voltage-to-ground detector is connected between the direct current bus and a reference ground. When the difference between the second voltage value and the first voltage value is greater than a first voltage threshold, the controller outputs the alarm information for grounding of the neutral wire of the transformer or controls the power conditioning apparatus to stop working.

In this implementation, the power supply system can determine, based on a magnitude relationship between two voltage to ground values that are of the direct current bus and that are obtained by the voltage-to-ground detector through detection before and after an action of the first grid-connected switch, whether the neutral wire of the transformer is grounded. This detection manner is simple and helps improve detection efficiency. In addition, when the neutral wire of the transformer is grounded, the power conditioning apparatus outputs the alarm information for grounding of the neutral wire of the transformer or stops working, to prompt the operator to check for the neutral wire grounding fault of the transformer in time to ensure that the neutral wire of the transformer is no longer grounded. In this way, the reliability of the power conditioning apparatus can be improved. Therefore, the reliability of the power supply system is improved.

With reference to the first aspect, in a fourth possible implementation, the power conditioning apparatus further includes a positive direct current bus, a negative direct current bus, a positive bus capacitor, and a negative bus capacitor. The end of the inverter circuit is connected to the direct current input end of the power conditioning apparatus through the positive direct current bus and the negative direct current bus separately. The positive bus capacitor and the negative bus capacitor are connected in series between the positive direct current bus and the negative direct current bus. The voltage-to-ground detector is connected between a bus neutral point and a reference ground. The bus neutral point is a junction between the positive bus capacitor and the negative bus capacitor. When the difference between the second voltage value and the first voltage value is greater than a first voltage threshold, the controller outputs the alarm information for grounding of the neutral wire of the transformer or controls the power conditioning apparatus to stop working.

In this implementation, the power supply system can determine, based on a magnitude relationship between two voltage to ground values that are of the bus neutral point and that are obtained by the voltage-to-ground detector through detection before and after an action of the first grid-connected switch, whether the neutral wire of the transformer is grounded. This detection manner is simple and helps improve detection efficiency. In addition, when the neutral wire of the transformer is grounded, the power conditioning apparatus outputs the alarm information for grounding of the neutral wire of the transformer or stops working, to prompt the operator to check for the neutral wire grounding fault of the transformer in time to ensure that the neutral wire of the transformer is no longer grounded. In this way, the reliability of the power conditioning apparatus can be improved. Therefore, the reliability of the power supply system is improved.

With reference to the first aspect, in a fifth possible implementation, the voltage-to-ground detector is connected between a reference ground and the direct current input end of the power conditioning apparatus. When the difference between the second voltage value and the first voltage value is greater than a first voltage threshold, the controller outputs the alarm information for grounding of the neutral wire of the transformer or controls the power conditioning apparatus to stop working.

In this implementation, the power supply system can determine, based on a magnitude relationship between two voltage to ground values that are of the direct current input end of the power conditioning apparatus and that are obtained by the voltage-to-ground detector through detection before and after an action of the first grid-connected switch, whether the neutral wire of the transformer is grounded. This detection manner is simple and helps improve detection efficiency. In addition, when the neutral wire of the transformer is grounded, the power conditioning apparatus outputs the alarm information for grounding of the neutral wire of the transformer or stops working, to prompt the operator to check for the neutral wire grounding fault of the transformer in time to ensure that the neutral wire of the transformer is no longer grounded. In this way, the reliability of the power conditioning apparatus can be improved. Therefore, the reliability of the power supply system is improved.

With reference to any one of the first aspect to the fifth possible implementation of the first aspect, in a sixth possible implementation, the controller further controls, before the power conditioning apparatus is started, the grid-connected switch to be turned off or turned on, so that the voltage-to-ground detector obtains the first voltage value or the second voltage value through detection.

In this embodiment, the power supply system detects, before the power conditioning apparatus is started, whether the neutral wire of the transformer is grounded, to take a corresponding measure based on a detection result. For example, the power conditioning apparatus is started only when it is determined that the neutral wire of the transformer is not grounded. This can effectively avoid a case in which a fault current damages the power conditioning apparatus due to grounding of the neutral wire of the transformer when a short circuit to ground occurs in a power transmission path on which the power conditioning apparatus is located, to improve the reliability of the power conditioning apparatus and therefore improve the reliability of the power supply system.

With reference to any one of the first aspect to the sixth possible implementation of the first aspect, in a seventh possible implementation, the controller further controls, when the difference between the second voltage value and the first voltage value does not fall within the preset voltage range, the power conditioning apparatus to be started.

In this implementation, the power conditioning apparatus is started only when it is determined that the neutral wire of the transformer is not grounded. This can effectively avoid a case in which a fault current damages the power conditioning apparatus due to grounding of the neutral wire of the transformer when a short circuit to ground occurs in a power transmission path on which the power conditioning apparatus is located, to improve the reliability of the power conditioning apparatus and therefore improve the reliability of the power supply system.

With reference to any one of the first aspect to the seventh possible implementation of the first aspect, in an eighth possible implementation, the power conditioning apparatus further includes a DC/DC conversion circuit and the direct current bus. The end of the inverter circuit is connected to an end of the DC/DC conversion circuit through the direct current bus, and another end of the DC/DC conversion circuit is connected to the direct current input end of the power conditioning apparatus.

In this implementation, the power conditioning apparatus may further include the DC/DC conversion circuit and the direct current bus. There are various functions and circuit structures, and flexibility is high.

According to a second aspect, the embodiments provide a power conditioning apparatus. The power conditioning apparatus includes a direct current input end, an inverter circuit, at least one grid-connected switch, a controller, a voltage-to-ground detector, and at least one alternating current output end. The direct current input end of the power conditioning apparatus is configured to connect to a direct current source. An end of the inverter circuit is configured to connect to the direct current input end, and another end of the inverter circuit is configured to connect to the at least one alternating current output end of the power conditioning apparatus through the at least one grid-connected switch. The at least one alternating current output end of the power conditioning apparatus is configured to connect to a transformer. When one of the at least one grid-connected switch is turned off, the voltage-to-ground detector detects a voltage to ground of the power conditioning apparatus to obtain a first voltage value; and when the grid-connected switch is turned on, the voltage-to-ground detector detects the voltage to ground of the power conditioning apparatus to obtain a second voltage value. Then the controller outputs alarm information for grounding of a neutral wire of the transformer or controls the power conditioning apparatus to stop working when a difference between the second voltage value and the first voltage value falls within a preset voltage range.

In this implementation, a difference that is between the second voltage value and the first voltage value and that exists when the neutral wire of the transformer is grounded varies greatly from a difference that is between the second voltage value and the first voltage value and that exists when the neutral wire of the transformer is not grounded. Therefore, the power conditioning apparatus can effectively determine, based on a magnitude relationship between two voltage to ground values that are of the power conditioning apparatus and that are obtained by the voltage-to-ground detector through detection before and after an action of the grid-connected switch (for example, a first grid-connected switch), whether the neutral wire of the transformer is grounded. This detection manner is simple and helps improve detection efficiency. In addition, when the neutral wire of the transformer is grounded, the power conditioning apparatus outputs the alarm information for grounding of the neutral wire of the transformer or stops working, to prompt an operator to check for a neutral wire grounding fault of the transformer in time to ensure that the neutral wire of the transformer is no longer grounded. This can avoid a case in which a fault current damages a device due to grounding of the neutral wire of the transformer when a short circuit to ground occurs in a power transmission path on which the power conditioning apparatus is located. Therefore, reliability of the power conditioning apparatus is improved.

With reference to the second aspect, in a first possible implementation, the voltage-to-ground detector is connected between a reference ground and the another end of the inverter circuit connected to the grid-connected switch. When the difference between the second voltage value and the first voltage value is greater than a first voltage threshold, the controller outputs the alarm information for grounding of the neutral wire of the transformer or controls the power conditioning apparatus to stop working.

In this implementation, the power conditioning apparatus can determine, based on a magnitude relationship between two voltage to ground values that are of the another end of the inverter circuit connected to the grid-connected switch and that are obtained by the voltage-to-ground detector through detection before and after an action of the grid-connected switch, whether the neutral wire of the transformer is grounded. This detection manner is simple and helps improve detection efficiency. In addition, when the neutral wire of the transformer is grounded, the power conditioning apparatus outputs the alarm information for grounding of the neutral wire of the transformer or stops working, to prompt the operator to check for the neutral wire grounding fault of the transformer in time to ensure that the neutral wire of the transformer is no longer grounded. Therefore, the reliability of the power conditioning apparatus can be improved.

With reference to the second aspect, in a second possible implementation, the voltage-to-ground detector is connected between a reference ground and one alternating current output end connected to the grid-connected switch. When the difference between the second voltage value and the first voltage value is less than a second voltage threshold, the controller outputs the alarm information for grounding of the neutral wire of the transformer or controls the power conditioning apparatus to stop working.

In this implementation, a position of the voltage-to-ground detector changes from a left side of the first grid-connected switch to a right side. A detection manner in which the power conditioning apparatus detects, when the voltage-to-ground detector is located on the right side of the first grid-connected switch, whether the neutral wire of the transformer is grounded is opposite to a detection manner in which the power conditioning apparatus detects, when the voltage-to-ground detector is located on the left side of the first grid-connected switch, whether the neutral wire of the transformer is grounded. There are various detection manners of the power conditioning apparatus, and flexibility is high. In addition, when the neutral wire of the transformer is grounded, the power conditioning apparatus outputs the alarm information for grounding of the neutral wire of the transformer or stops working, to prompt the operator to check for the neutral wire grounding fault of the transformer in time to ensure that the neutral wire of the transformer is no longer grounded. Therefore, the reliability of the power conditioning apparatus can be improved.

With reference to the second aspect, in a third possible implementation, the power conditioning apparatus further includes a direct current bus. The end of the inverter circuit is connected to the direct current input end of the power conditioning apparatus through the direct current bus. The voltage-to-ground detector is connected between the direct current bus and a reference ground. When the difference between the second voltage value and the first voltage value is greater than a first voltage threshold, the controller outputs the alarm information for grounding of the neutral wire of the transformer or controls the power conditioning apparatus to stop working.

In this implementation, the power conditioning apparatus can determine, based on a magnitude relationship between two voltage to ground values that are of the direct current bus and that are obtained by the voltage-to-ground detector through detection before and after an action of the first grid-connected switch, whether the neutral wire of the transformer is grounded. This detection manner is simple and helps improve detection efficiency. In addition, when the neutral wire of the transformer is grounded, the power conditioning apparatus outputs the alarm information for grounding of the neutral wire of the transformer or stops working, to prompt the operator to check for the neutral wire grounding fault of the transformer in time to ensure that the neutral wire of the transformer is no longer grounded. Therefore, the reliability of the power conditioning apparatus can be improved.

With reference to the second aspect, in a fourth possible implementation, the power conditioning apparatus further includes a positive direct current bus, a negative direct current bus, a positive bus capacitor, and a negative bus capacitor. The end of the inverter circuit is connected to the direct current input end of the power conditioning apparatus through the positive direct current bus and the negative direct current bus separately. The positive bus capacitor and the negative bus capacitor are connected in series between the positive direct current bus and the negative direct current bus. The voltage-to-ground detector is connected between a bus neutral point and a reference ground. The bus neutral point is a junction between the positive bus capacitor and the negative bus capacitor. When the difference between the second voltage value and the first voltage value is greater than a first voltage threshold, the controller outputs the alarm information for grounding of the neutral wire of the transformer or controls the power conditioning apparatus to stop working.

In this implementation, the power conditioning apparatus can determine, based on a magnitude relationship between two voltage to ground values that are of the bus neutral point and that are obtained by the voltage-to-ground detector through detection before and after an action of the first grid-connected switch, whether the neutral wire of the transformer is grounded. This detection manner is simple and helps improve detection efficiency. In addition, when the neutral wire of the transformer is grounded, the power conditioning apparatus outputs the alarm information for grounding of the neutral wire of the transformer or stops working, to prompt the operator to check for the neutral wire grounding fault of the transformer in time to ensure that the neutral wire of the transformer is no longer grounded. Therefore, the reliability of the power conditioning apparatus can be improved.

With reference to the second aspect, in a fifth possible implementation, the voltage-to-ground detector is connected between a reference ground and the direct current input end of the power conditioning apparatus. When the difference between the second voltage value and the first voltage value is greater than a first voltage threshold, the controller outputs the alarm information for grounding of the neutral wire of the transformer or controls the power conditioning apparatus to stop working.

In this implementation, the power conditioning apparatus can determine, based on a magnitude relationship between two voltage to ground values that are of the direct current input end of the power conditioning apparatus and that are obtained by the voltage-to-ground detector through detection before and after an action of the first grid-connected switch, whether the neutral wire of the transformer is grounded. This detection manner is simple and helps improve detection efficiency. In addition, when the neutral wire of the transformer is grounded, the power conditioning apparatus outputs the alarm information for grounding of the neutral wire of the transformer or stops working, to prompt the operator to check for the neutral wire grounding fault of the transformer in time to ensure that the neutral wire of the transformer is no longer grounded. Therefore, the reliability of the power conditioning apparatus can be improved.

With reference to any one of the second aspect to the fifth possible implementation of the second aspect, in a sixth possible implementation, the controller further controls, before the power conditioning apparatus is started, the grid-connected switch to be turned off or turned on, so that the voltage-to-ground detector obtains the first voltage value or the second voltage value through detection.

In this embodiment, the power supply system detects, before the power conditioning apparatus is started, whether the neutral wire of the transformer is grounded, to take a corresponding measure based on a detection result. For example, the power conditioning apparatus is started only when it is determined that the neutral wire of the transformer is not grounded. This can effectively avoid a case in which a fault current damages the power conditioning apparatus due to grounding of the neutral wire of the transformer when a short circuit to ground occurs in a power transmission path on which the power conditioning apparatus is located, to improve the reliability of the power conditioning apparatus.

With reference to any one of the second aspect to the sixth possible implementation of the second aspect, in a seventh possible implementation, the controller further controls, when the difference between the second voltage value and the first voltage value does not fall within the preset voltage range, the power conditioning apparatus to be started.

In this implementation, the power conditioning apparatus is started only when it is determined that the neutral wire of the transformer is not grounded. This can effectively avoid a case in which a fault current damages the power conditioning apparatus due to grounding of the neutral wire of the transformer when a short circuit to ground occurs in a power transmission path on which the power conditioning apparatus is located, to improve the reliability of the power conditioning apparatus.

With reference to any one of the second aspect to the seventh possible implementation of the second aspect, in an eighth possible implementation, the power conditioning apparatus further includes a DC/DC conversion circuit and the direct current bus. The end of the inverter circuit is connected to an end of the DC/DC conversion circuit through the direct current bus, and another end of the DC/DC conversion circuit is connected to the direct current input end of the power conditioning apparatus.

In this implementation, the power conditioning apparatus may further include the DC/DC conversion circuit and the direct current bus. There are various functions and circuit structures, and flexibility is high.

According to a third aspect, the embodiments provide a power conditioning system. The power conditioning system includes a power conditioning apparatus and a voltage-to-ground detector. The power conditioning apparatus includes a direct current input end, an inverter circuit, at least one grid-connected switch, a controller, at least one alternating current output end, and a voltage detection end. The direct current input end of the power conditioning apparatus is configured to connect to a direct current source. An end of the inverter circuit is configured to connect to the direct current input end, and another end of the inverter circuit is configured to connect to the at least one alternating current output end through the at least one grid-connected switch. The at least one alternating current output end is configured to connect to a transformer. The voltage detection end is configured to connect to the voltage-to-ground detector. When one grid-connected switch is turned off, the voltage-to-ground detector detects a voltage to ground of the voltage detection end to obtain a first voltage value; and when the grid-connected switch is turned on, the voltage-to-ground detector detects a voltage to ground of the voltage detection end to obtain a second voltage value. Then the controller outputs alarm information for grounding of a neutral wire of the transformer or controls the power conditioning apparatus to stop working when a difference between the second voltage value and the first voltage value falls within a preset voltage range.

In this implementation, a difference that is between the second voltage value and the first voltage value and that exists when the neutral wire of the transformer is grounded varies greatly from a difference that is between the second voltage value and a first voltage value and that exists when the neutral wire of the transformer is not grounded. Therefore, the power conditioning apparatus can effectively determine, based on a magnitude relationship between two voltage to ground values that are of the voltage detection end and that are obtained by the voltage-to-ground detector through detection before and after an action of a first grid-connected switch, whether the neutral wire of the transformer is grounded. This detection manner is simple and helps improve detection efficiency. In addition, when the neutral wire of the transformer is grounded, the power conditioning apparatus outputs the alarm information for grounding of the neutral wire of the transformer or stops working, to prompt an operator to check for a neutral wire grounding fault of the transformer in time to ensure that the neutral wire of the transformer is no longer grounded. Therefore, reliability of the power conditioning system can be improved.

According to a fourth aspect, the embodiments provide a power supply system. The power supply system includes a transformer and the power conditioning system provided in the third aspect. At least one alternating current output end of the power conditioning apparatus is connected to an input end of the transformer, and an output end of the transformer is configured to connect to a power grid.

In this implementation, a difference that is between a second voltage value and a first voltage value and that exists when a neutral wire of the transformer is grounded varies greatly from a difference that is between the second voltage value and the first voltage value and that exists when the neutral wire of the transformer is not grounded. Therefore, the power conditioning apparatus can effectively determine, based on a magnitude relationship between two voltage to ground values that are of a voltage detection end and that are obtained by a voltage-to-ground detector through detection before and after an action of one grid-connected switch, whether the neutral wire of the transformer is grounded. This detection manner is simple and helps improve detection efficiency. In addition, when the neutral wire of the transformer is grounded, the power conditioning apparatus outputs alarm information for grounding of a neutral wire of the transformer or stops working, to prompt an operator to check for a neutral wire grounding fault of the transformer in time to ensure that the neutral wire of the transformer is no longer grounded. Therefore, reliability of the power supply system can be improved.

DETAILED DESCRIPTION OF EMBODIMENTS

The power conditioning apparatus, the power conditioning system, and the power supply system provided in the embodiments are all applicable to a plurality of application fields, such as the field of energy storage and power generation, the field of photovoltaic power generation, the field of new energy and smart microgrid, and the field of power transmission and distribution. The power conditioning apparatus provided in the embodiments may be a photovoltaic inverter, a power conversion system (PCS), an uninterruptible power supply (UPS), or the like, and is applicable to different application scenarios, for example, a photovoltaic power supply scenario, an energy storage power supply scenario, a photovoltaic storage hybrid power supply scenario, and a UPS power supply scenario. The following uses the photovoltaic energy storage power supply scenario as an example for description.

Figure 1:
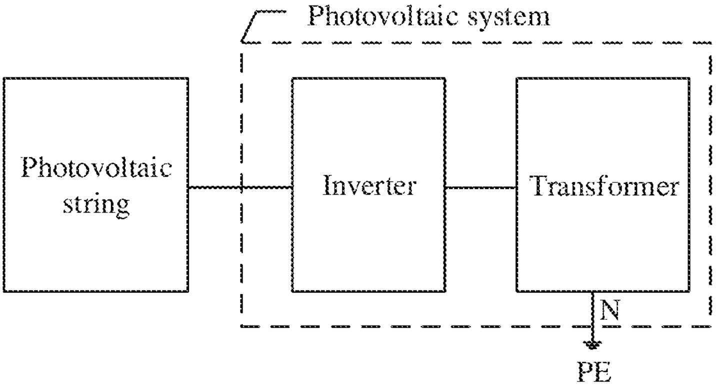
FIG. 1 is a schematic of a structure of a photovoltaic system in the conventional technology.
Figure 2:
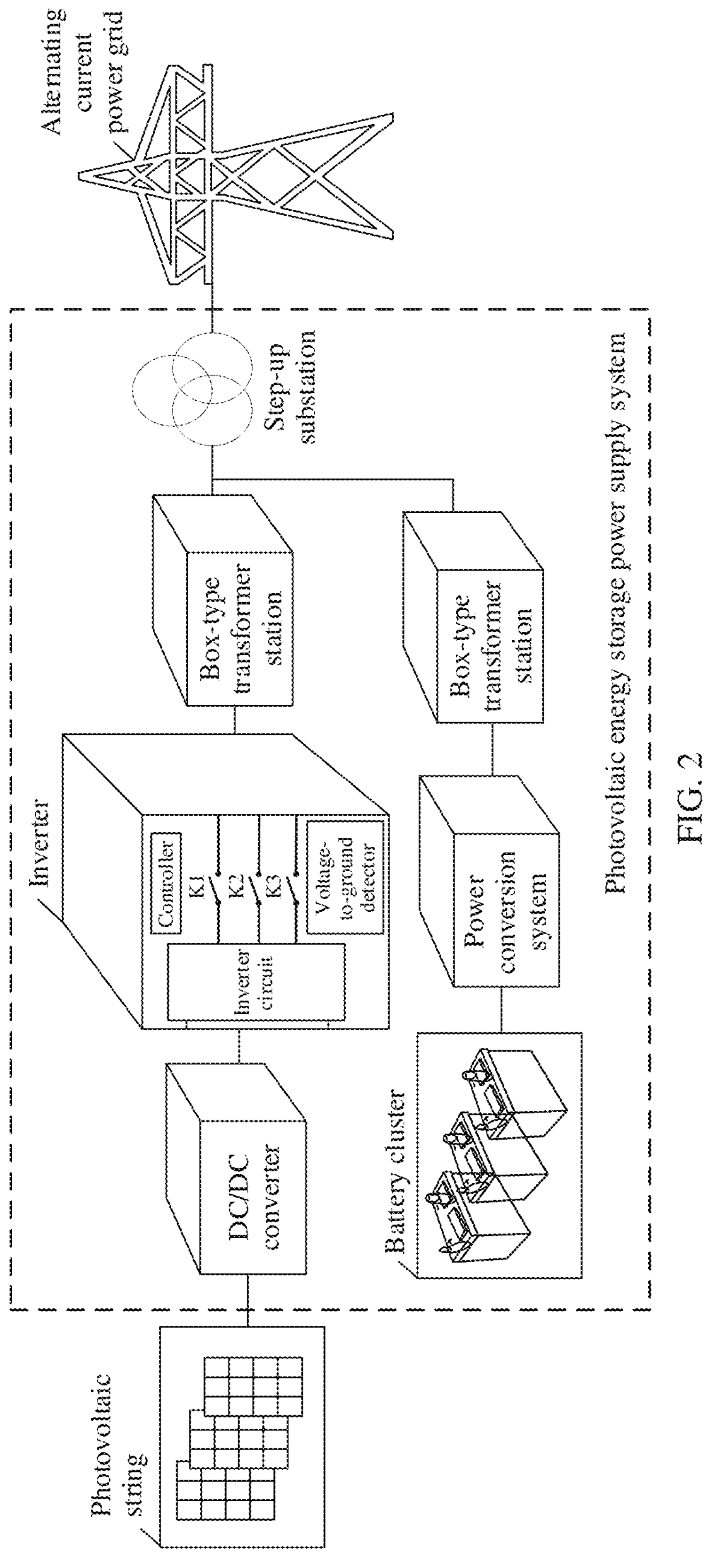
FIG. 2 is a schematic of an application scenario of a power supply system according to the embodiments.

FIG. 2 is a schematic of an application scenario of a power supply system according to the embodiments. The power supply system provided in the embodiments includes a power conditioning apparatus, a transformer, and a controller. As shown in FIG. 2, in a photovoltaic energy storage power supply scenario, the power supply system provided in the embodiments is a photovoltaic energy storage power supply system shown in FIG. 2. The photovoltaic energy storage power supply system includes a photovoltaic string, a DC/DC converter, an inverter, a battery cluster, a power conversion system, two box-type transformer stations, and a step-up substation. The transformer provided in the embodiments is the box-type transformer station shown in FIG. 2, and the power conditioning apparatus provided in the embodiments is the inverter or the power conversion system shown in FIG. 2. Regardless of whether the power conditioning apparatus provided in the embodiments is the inverter or the power conversion system, working principles of detecting, by the power conditioning apparatus, whether a neutral wire of the box-type transformer station is grounded are the same. Therefore, for ease of description, the following uses an example in which the power conditioning apparatus is the inverter shown in FIG. 2 for description. The controller provided in the embodiments is a controller in the inverter shown in FIG. 2.

The inverter includes a direct current input end, an inverter circuit, a voltage-to-ground detector, a grid-connected switch K1, a grid-connected switch K2, a grid-connected switch K3, a controller, and three-phase alternating current output ends. The direct current input end of the inverter is connected to the photovoltaic string through the DC/DC converter, and the three-phase alternating current output ends of the inverter are connected to an input end of one box-type transformer station. A direct current input end of the inverter circuit is connected to the direct current input end of the inverter, three-phase alternating current output ends of the inverter circuit are connected, through the three grid-connected switches (that is, K1 to K3) that are in a one-to-one correspondence with the three-phase alternating current output ends of the inverter circuit, to the three-phase alternating current output ends that are of the inverter and that correspond to the three grid-connected switches. An input end of the power conversion system is connected to the battery cluster, and an output end of the power conversion system is connected to an input end of the other box-type transformer station. Output ends of the two box-type transformer stations are connected in parallel and then connected to an input end of the step-up substation, and an output end of the step-up substation is connected to an alternating current power grid.

Before the inverter is started, when any one of the three grid-connected switches (for example, the grid-connected switch K1) is turned off, the voltage-to-ground detector detects a voltage to ground of the inverter to obtain a first voltage value; and when the grid-connected switch K1 is turned on, the voltage-to-ground detector detects a voltage to ground of the inverter to obtain a second voltage value. When a difference between the second voltage value and the first voltage value falls within a preset voltage range, which indicates that a neutral wire of the box-type transformer station connected to the three-phase alternating current output ends of the inverter is grounded, the controller outputs alarm information for grounding of a neutral wire of the box-type transformer station or controls the inverter to stop working. In addition, when the difference between the second voltage value and the first voltage value does not fall within the preset voltage range, which indicates that the neutral wire of the box-type transformer station connected to the inverter is not grounded, the controller controls the inverter to be started. Likewise, the power conversion system is also started when a neutral wire of the box-type transformer station connected to the power conversion system is not grounded.

After the inverter and the power conversion system are started, the photovoltaic energy storage power supply system starts to work. For example, the DC/DC converter performs direct current conversion on a direct current generated by the photovoltaic string connected to an input end of the DC/DC converter, and then outputs a direct current to the inverter. The inverter may invert, to an alternating current by controlling the inverter circuit, the direct current that is obtained through direct current conversion and that is input through the input end of the inverter, and output the alternating current to the box-type transformer station connected to the inverter. In addition, the power conversion system inverts, to an alternating current, a direct current output by the battery cluster, and outputs the alternating current to the box-type transformer station connected to the power conversion system. Each box-type transformer station performs voltage step-up on the alternating current input through the input end of the box-type transformer station, and then outputs an alternating current obtained through voltage step-up to the step-up substation. The step-up substation performs voltage step-up on the alternating current input through the input end of the step-up substation, to obtain an alternating current that meets a requirement of the alternating current power grid. Therefore, power is supplied to different types of electric devices such as the alternating current power grid.

It may be understood that the photovoltaic energy storage power supply system may effectively determine, based on a magnitude relationship between two voltage to ground values that are of the inverter and that are obtained by the voltage-to-ground detector through detection before and after an action of the any one of the three grid-connected switches, whether the neutral wire of the box-type transformer station connected to the inverter is grounded. This detection manner is simple and helps improve detection efficiency. In addition, because the voltage-to-ground detector and the three grid-connected switches are all existing circuit components in the inverter, no additional circuit component is required in this detection manner, and detection costs can be reduced. Also, the inverter is started only when it is determined that the neutral wire of the box-type transformer station connected to the inverter is not grounded. This can effectively avoid a case in which a fault current damages a device due to grounding of the neutral wire of the box-type transformer station when a short circuit to ground occurs in a power transmission path of the photovoltaic energy storage power supply system. Therefore, reliability of the photovoltaic energy storage power supply system can be improved.

The foregoing is merely an example of the application scenario of the power supply system provided in the embodiments, but is not exhaustive. The application scenario is not limited.

With reference to FIG. 3 to FIG. 8, the following describes, by using an example, working principles of the power supply system, the power conditioning apparatus, and the power conditioning system provided in the embodiments.

Figure 3:
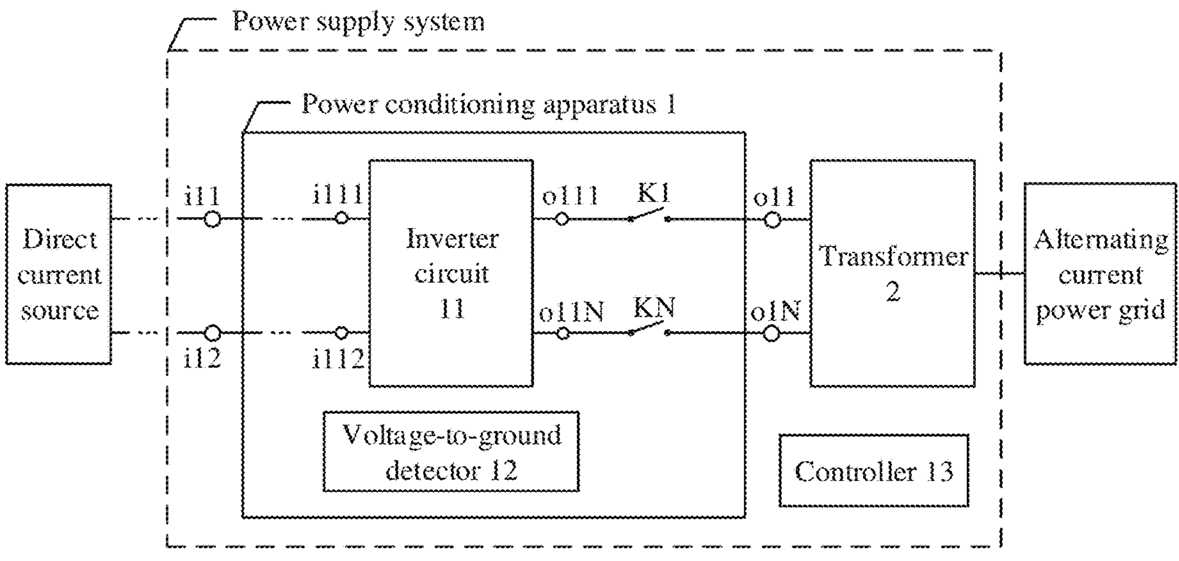
FIG. 3 is a schematic of a structure of a power supply system according to the embodiments.

FIG. 3 is a schematic of a structure of a power supply system according to the embodiments. As shown in FIG. 3, the power supply system includes a power conditioning apparatus 1, a transformer 2, and a controller 13. The power conditioning apparatus 1 includes direct current input ends i11 and i12, an inverter circuit 11, a voltage-to-ground detector 12, a grid-connected switch K1, and an alternating current output end o11. The direct current input ends i11 and i12 of the power conditioning apparatus 1 are configured to connect to a positive electrode and a negative electrode of a direct current source respectively. The direct current source includes a photovoltaic string or a battery cluster. The alternating current output end o11 of the power conditioning apparatus 1 is configured to connect to an input end of the transformer 2, and an output end of the transformer 2 is configured to connect to an alternating current power grid. An end of the inverter circuit 11, such as direct current input ends i111 and i112 of the inverter circuit 11 are configured to connect to the direct current input ends i11 and i12 of the power conditioning apparatus 1, respectively. Another end of the inverter circuit 11, such as an alternating current output end o111 of the inverter circuit 11 is configured to connect to the alternating current output end o11 of the power conditioning apparatus 1 through the grid-connected switch K1. The power conditioning apparatus 1 further includes a neutral wire grid-connected switch KN and a neutral wire output end o1N. The inverter circuit 11 further includes a neutral wire output end o11N. The neutral wire output end o11N of the inverter circuit 11 is configured to connect to the neutral wire output end o1N of the power conditioning apparatus 1 through the neutral wire grid-connected switch KN. The neutral wire output end o1N of the power conditioning apparatus 1 is configured to connect to the input end of the transformer 2.

It should be noted that, in the embodiments, that A is connected to B may be that A is directly connected to B or A is indirectly connected to B through C. This is not limited. For example, the direct current input end of the inverter circuit 11 may be directly connected to the direct current input end of the power conditioning apparatus 1. Alternatively, when the power conditioning apparatus 1 further includes a DC/DC conversion circuit, the direct current input end of the inverter circuit 11 may be indirectly connected to the direct current input end of the power conditioning apparatus 1 through the DC/DC conversion circuit.

In an implementation, when the grid-connected switch K1 is turned off, the voltage-to-ground detector 12 detects a voltage to ground of the power conditioning apparatus 1 to obtain a first voltage value; and when the grid-connected switch K1 is turned on, the voltage-to-ground detector 12 detects the voltage to ground of the power conditioning apparatus 1 to obtain a second voltage value. Then, the controller 13 obtains the first voltage value and the second voltage value through the voltage-to-ground detector 12. When a difference between the second voltage value and the first voltage value falls within a preset voltage range, which indicates that a neutral wire of the transformer 2 is grounded, that is, the neutral wire of the transformer 2 is connected to a reference ground PE, the controller 13 outputs alarm information for grounding of the neutral wire of the transformer 2, or the controller 13 controls the power conditioning apparatus 1 to stop working, that is, the controller 13 stops working. That the controller 13 stops working means that the controller 13 is powered on but no longer outputs a control signal.

In this embodiment, a difference that is between the second voltage value and the first voltage value and that exists when the neutral wire of the transformer 2 is grounded varies greatly from a difference that is between the second voltage value and the first voltage value and that exists when the neutral wire of the transformer 2 is not grounded. Therefore, the power supply system can effectively determine, based on a magnitude relationship between two voltage to ground values that are of the power conditioning apparatus 1 and that are obtained by the voltage-to-ground detector 12 through detection before and after an action of the grid-connected switch K1, whether the neutral wire of the transformer 2 is grounded. This detection manner is simple and helps improve detection efficiency. In addition, when the neutral wire of the transformer 2 is grounded, the power conditioning apparatus 1 outputs the alarm information for grounding of the neutral wire of the transformer 2 or stops working, to prompt an operator to check for a neutral wire grounding fault of the transformer 2 in time to ensure that the neutral wire of the transformer 2 is no longer grounded. This can avoid a case in which a fault current damages a device due to grounding of the neutral wire of the transformer 2 when a short circuit to ground occurs in a power transmission path on which the power conditioning apparatus 1 is located, to improve reliability of the power conditioning apparatus 1 and therefore improve reliability of the power supply system. Because the voltage-to-ground detector 12 and the grid-connected switch K1 are both existing circuit components in the power conditioning apparatus 1, no additional circuit component is required in this detection manner, and detection costs can be reduced.

It should be noted that the controller in the power supply system provided in the embodiments may be a system controller independent of the power conditioning apparatus 1 and the transformer 2, or may be a controller located inside the power conditioning apparatus 1. This is not limited. Regardless of whether the controller in the power supply system is the system controller or the controller inside the power conditioning apparatus 1, working principles of the power supply system are the same. Therefore, for ease of description, the following uses an example in which the controller in the power supply system is the controller inside the power conditioning apparatus 1 for description.

Figure 4A:
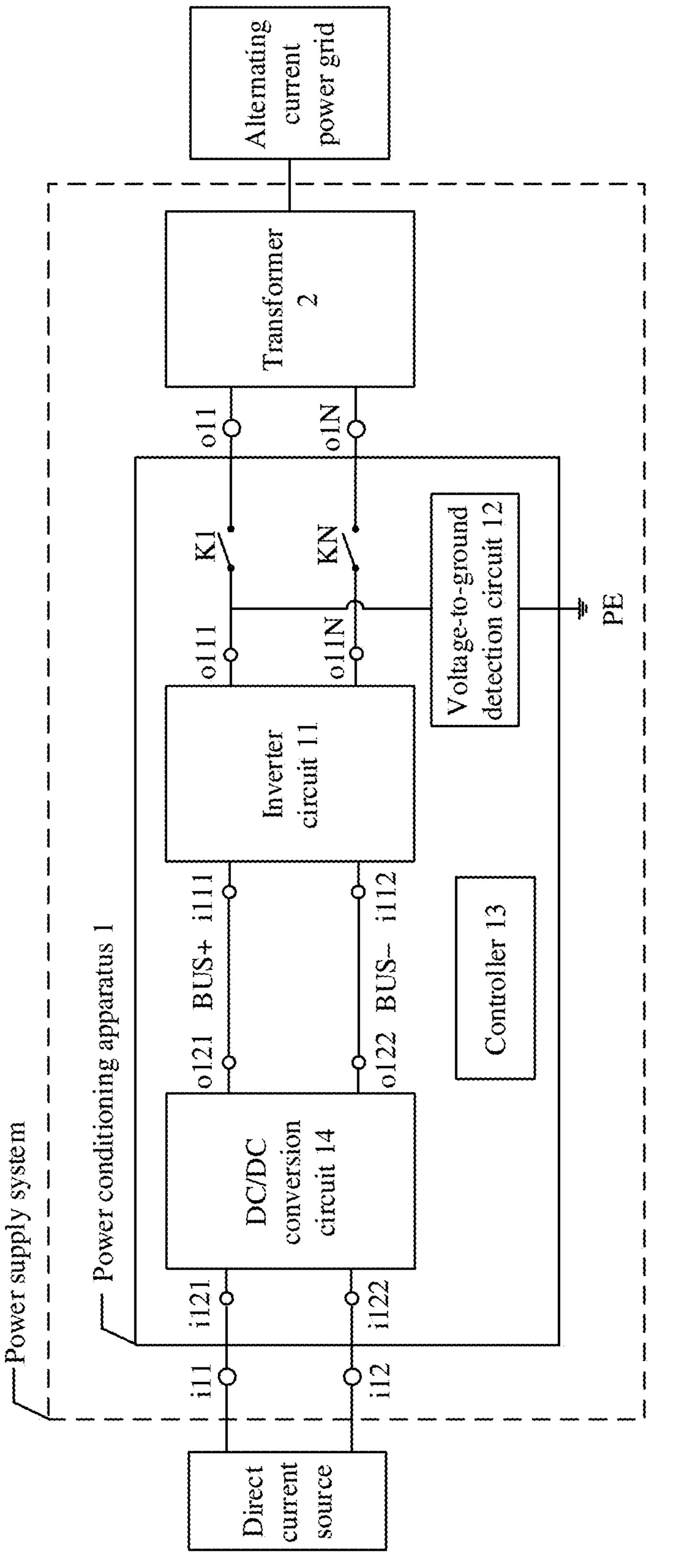
FIG. 4*a* is a schematic of another structure of a power supply system according to the embodiments.
Figure 4B:
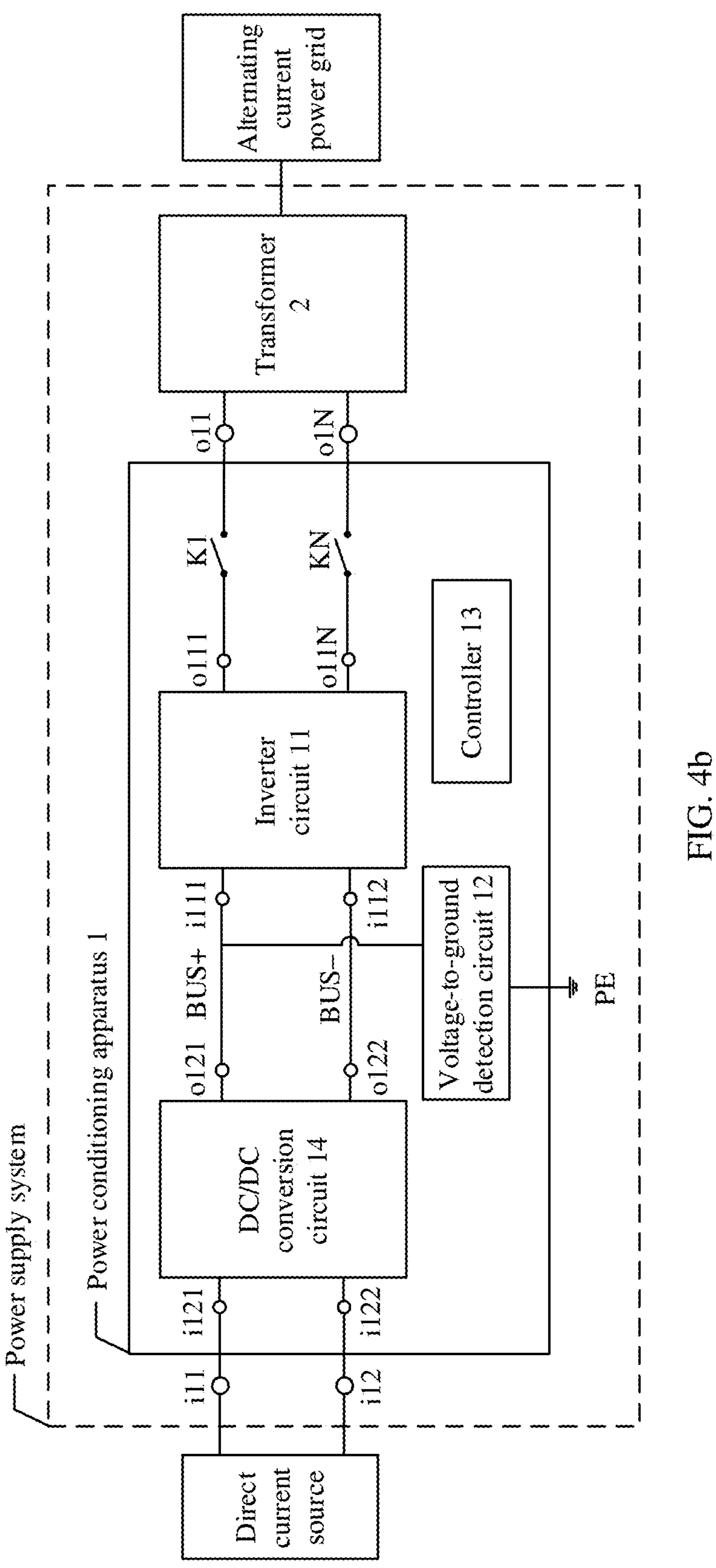
FIG. 4*b* is a schematic of another structure of a power supply system according to the embodimentson.
Figure 4C:
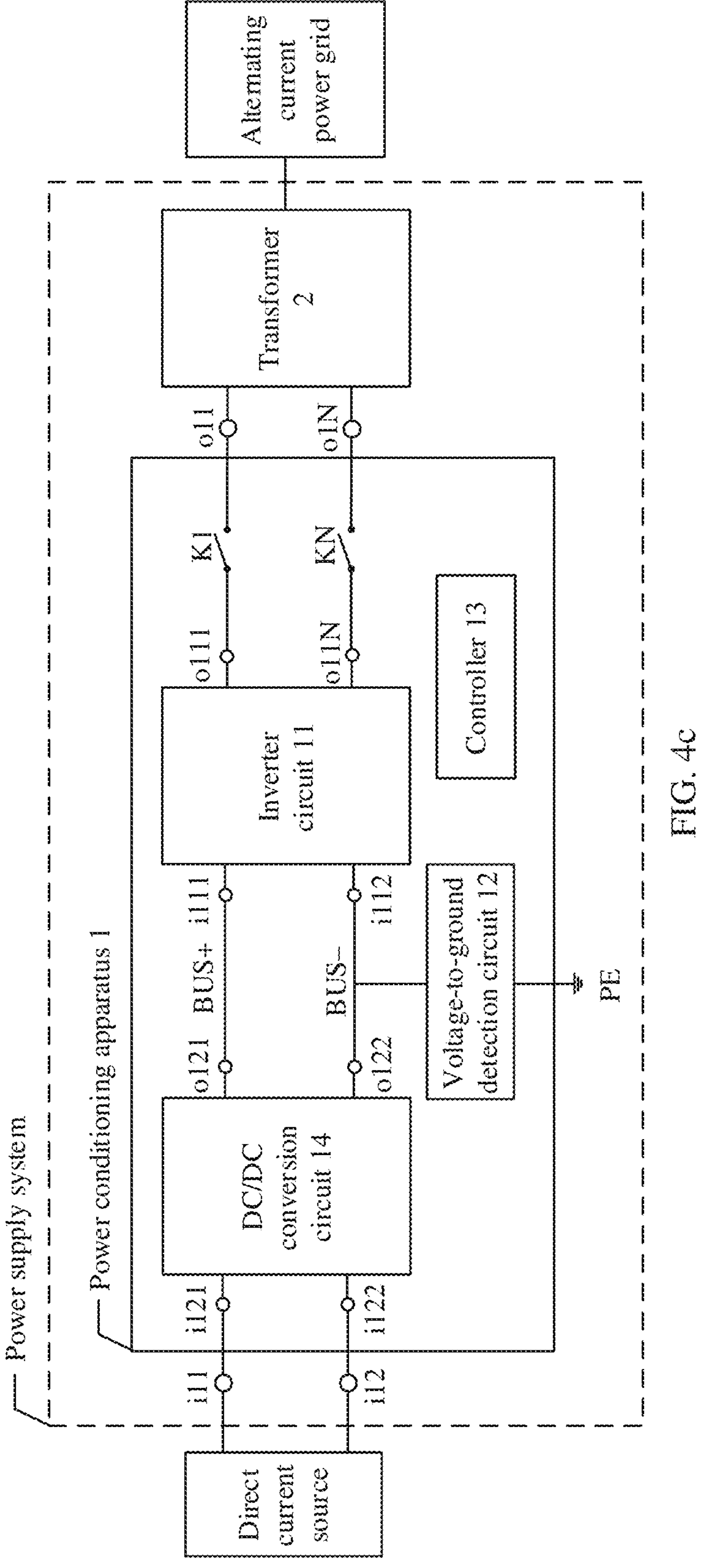
FIG. 4*c* is a schematic of another structure of a power supply system according to the embodiments.
Figure 4D:
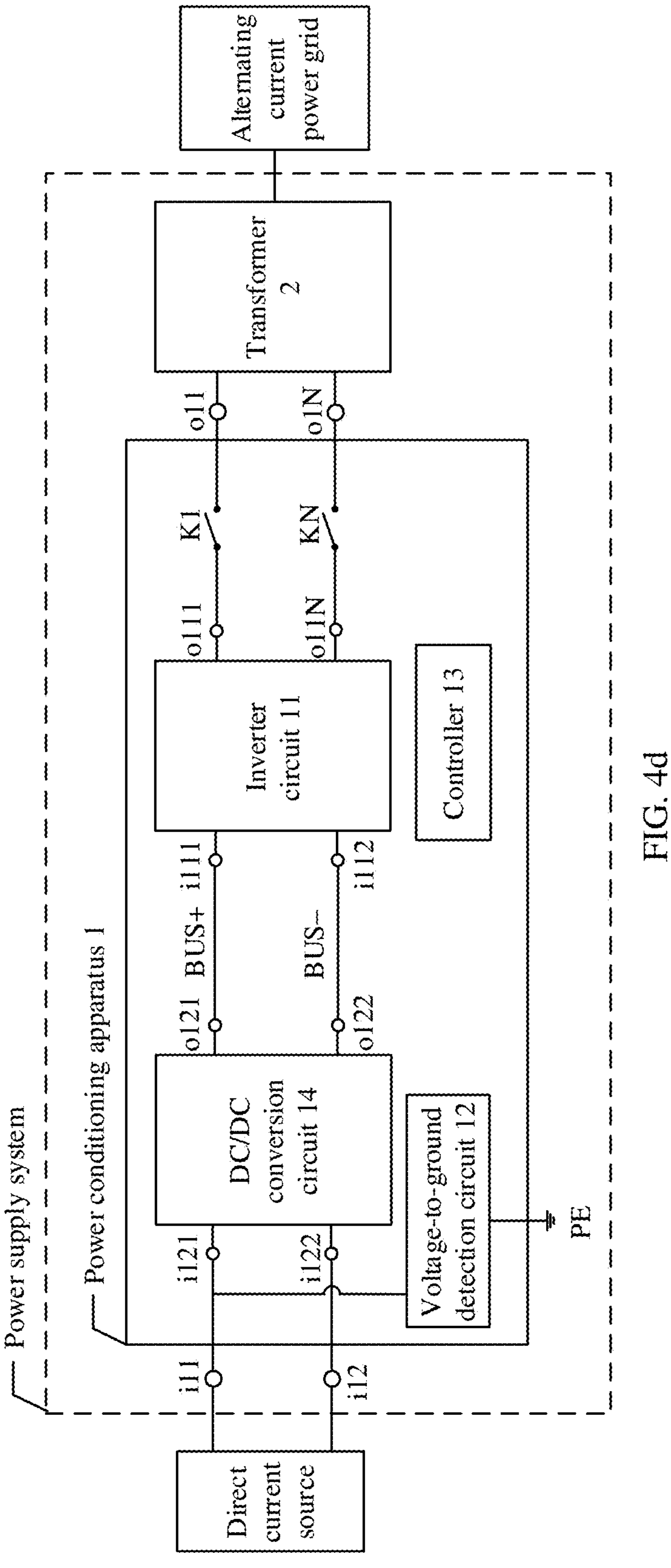
FIG. 4*d* is a schematic of another structure of a power supply system according to the embodiments.
Figure 4E:
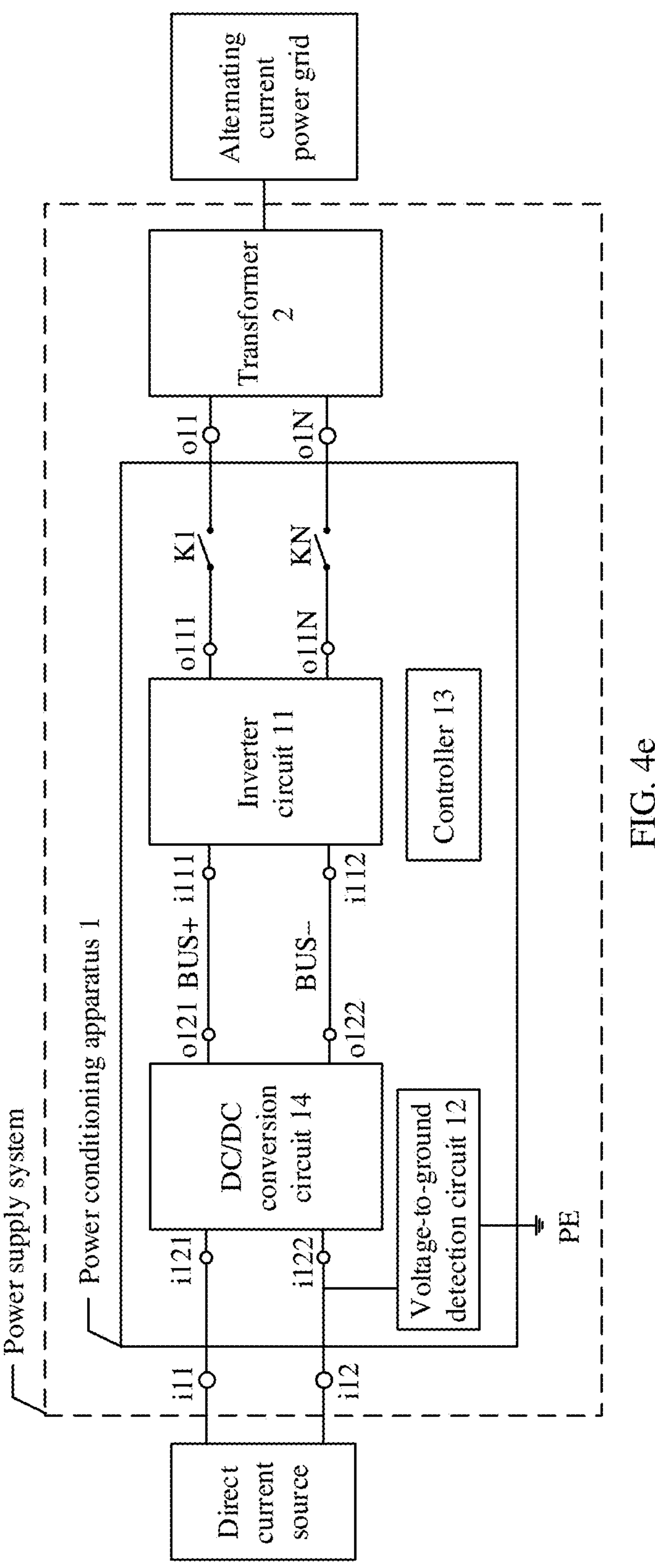
FIG. 4*e* is a schematic of another structure of a power supply system according to the embodiments.

For example, FIG. **4*a* is a schematic of another structure of a power supply system according to the embodiments. As shown in FIG. 4*a*, compared with the power conversion apparatus 1 shown in FIG. 3, a power conditioning apparatus 1 shown in FIG. 4*a* further includes a direct current bus and a DC/DC conversion circuit 14. Direct current input ends of an inverter circuit 11 are connected to an end of the DC/DC conversion circuit 14 (such as direct current output ends of the DC/DC conversion circuit 14) through the direct current bus. Another end of the DC/DC conversion circuit 14 (such as direct current input ends of the DC/DC conversion circuit 14) is connected to direct current input ends of the power conditioning apparatus 1. For example, the direct current bus includes a positive direct current bus BUS+ and a negative direct current bus BUS−. A direct current input end i111 of the inverter circuit 11 is connected to a direct current output end o121 of the DC/DC conversion circuit 14 through the positive direct current bus BUS+. A direct current input end il12 of the inverter circuit 11 is connected to a direct current output end o122 of the DC/DC conversion circuit 14 through the negative direct current bus BUS−. Direct current input ends i121 and i122 of the DC/DC conversion circuit 14 are connected to direct current input ends i11 and i12 of the power conditioning apparatus 1 respectively. A voltage-to-ground detector 12 is connected between a reference ground PE and an alternating current output end o111 of the inverter circuit 11 connected to a grid-connected switch K1. The voltage-to-ground detector 12** is any voltage detection circuit that can measure both an alternating current voltage and a direct current voltage, for example, a voltmeter or a voltage divider circuit.

In an implementation, before the power conditioning apparatus 1 is started, a controller 13 controls the grid-connected switch K1 to be turned off, and sends a sampling control signal to the voltage-to-ground detector 12. After receiving the sampling control signal, the voltage-to-ground detector 12 collects a voltage to ground of the power conditioning apparatus 1, such as a voltage between the alternating current output end o111 of the inverter circuit 11 and the reference ground PE to obtain a first voltage value, and sends the first voltage value to the controller 13. Then, the controller 13 controls the grid-connected switch K1 to be turned on, and sends a sampling control signal to the voltage-to-ground detector 12. After receiving the sampling control signal, the voltage-to-ground detector 12 collects the voltage between the alternating current output end o111 of the inverter circuit 11 and the reference ground PE to obtain a second voltage value, and sends the second voltage value to the controller 13.

After the controller 13 receives the first voltage value and the second voltage value that are sent by the voltage-to-ground detector 12, when a difference between the second voltage value and the first voltage value is greater than a first voltage threshold, which indicates that a neutral wire of the transformer 2 is grounded, the controller 13 stops working, to cause the power conditioning apparatus 1 to be in a sleep state. In this way, an operator is prompted to check for a fault in time. Optionally, when the difference between the second voltage value and the first voltage value is greater than the first voltage threshold, the controller 13 outputs alarm information for grounding of the neutral wire of the transformer 2, or sends alarm information for grounding of the neutral wire of the transformer 2 to an upper-level device or a terminal device to cause the upper-level device or the terminal device to output, through a display, the alarm information for grounding of the neutral wire of the transformer 2. In this way, the operator is prompted to take a corresponding protection measure, for example, controlling a switch between the transformer 2 and an alternating current power grid to be turned off or checking for a neutral wire fault of the transformer 2 to ensure that the neutral wire of the transformer 2 is no longer grounded.

In addition, after the controller 13 receives the first voltage value and the second voltage value that are sent by the voltage-to-ground detector 12, when the difference between the second voltage value and the first voltage value is less than or equal to the first voltage threshold, which indicates that the neutral wire of the transformer 2 is not connected to the reference ground PE, the controller 13 controls the power conditioning apparatus 1 to be started. For example, the controller 13 controls both the grid-connected switch K1 and a neutral wire grid-connected switch KN to be turned on, and controls both the DC/DC conversion circuit 14 and the inverter circuit 11 to start to output a voltage.

It may be understood that, before the power conditioning apparatus 1 is started, neither the DC/DC conversion circuit 14 nor the inverter circuit 11 starts to work. In a case in which the neutral wire of the transformer 2 is not grounded, regardless of whether the grid-connected switch K1 is turned on or turned off, a loop cannot be formed between the alternating current power grid and the alternating current output end o111. In this case, the first voltage value and the second voltage value that are obtained by the voltage-to-ground detector 12 are basically the same, and the difference between the second voltage value and the first voltage value is less than or equal to the first voltage threshold. In a case in which the neutral wire of the transformer 2 is grounded, when the grid-connected switch K1 is turned off, the loop cannot be formed between the alternating current power grid and the alternating current output end o111; and when the grid-connected switch K1 is turned on, the loop is formed between the alternating current power grid and the alternating current output end o111. Therefore, the first voltage value obtained through detection when the grid-connected switch K1 is turned off is less than the second voltage value obtained through detection when the grid-connected switch K1 is turned on, so that the difference between the second voltage value and the first voltage value is greater than the first voltage threshold. Based on this, it can be understood that the power conditioning apparatus 1 can effectively determine, based on a magnitude relationship between two voltage to ground values that are of the power conditioning apparatus 1 and that are obtained by the voltage-to-ground detector 12 through detection before and after an action of the grid-connected switch K1, whether the neutral wire of the transformer 2 is grounded.

Optionally, the voltage-to-ground detector 12 may alternatively be connected between the positive direct current bus BUS+ and the reference ground PE. For details, refer to a power supply system shown in FIG. 4*b*. When the voltage-to-ground detector 12 is connected between the positive direct current bus BUS+ and the reference ground PE, a component forming a loop with the alternating current power grid changes from the alternating current output end o111 to the positive direct current bus BUS+ in a detection principle according to which the power conditioning apparatus 1 can effectively determine whether the neutral wire of the transformer 2 is grounded. For example, in a case in which the neutral wire of the transformer 2 is not grounded, regardless of whether the grid-connected switch K1 is turned on or turned off, a loop cannot be formed between the alternating current power grid and the positive direct current bus BUS+. In this case, the first voltage value and the second voltage value that are obtained by the voltage-to-ground detector 12 are basically the same, and the difference between the second voltage value and the first voltage value is less than or equal to the first voltage threshold. In a case in which the neutral wire of the transformer 2 is grounded, when the grid-connected switch K1 is turned off, the loop cannot be formed between the alternating current power grid and the positive direct current bus BUS+; and when the grid-connected switch K1 is turned on, the loop is formed between the alternating current power grid and the positive direct current bus BUS+. Thus, the first voltage value obtained through detection when the grid-connected switch K1 is turned off is less than the second voltage value obtained through detection when the grid-connected switch K1 is turned on, so that the difference between the second voltage value and the first voltage value is greater than the first voltage threshold.

Optionally, the voltage-to-ground detector 12 may alternatively be connected between the negative direct current bus BUS− and the reference ground PE. For details, refer to a power supply system shown in FIG. 4*c*. When the voltage-to-ground detector 12 is connected between the negative direct current bus BUS− and the reference ground PE, a component forming a loop with the alternating current power grid changes from the alternating current output end o111 to the negative direct current bus BUS− in a detection principle according to which the power conditioning apparatus 1 can effectively determine whether the neutral wire of the transformer 2 is grounded.

Optionally, the voltage-to-ground detector 12 may alternatively be connected between the reference ground PE and the direct current input end i11 of the power conditioning apparatus 1. For details, refer to a power supply system shown in FIG. 4*d*. When the voltage-to-ground detector 12 is connected between the direct current input end i11 and the reference ground PE, a component forming a loop with the alternating current power grid changes from the alternating current output end o111 to the direct current input end i11 in a detection principle according to which the power conditioning apparatus 1 can effectively determine whether the neutral wire of the transformer 2 is grounded.

Optionally, the voltage-to-ground detector 12 may alternatively be connected between the reference ground PE and the direct current input end i12 of the power conditioning apparatus 1. For details, refer to a power supply system shown in FIG. 4*e*. When the voltage-to-ground detector 12 is connected between the direct current input end i12 and the reference ground PE, a component forming a loop with the alternating current power grid changes from the alternating current output end o111 to the direct current input end i12 in a detection principle according to which the power conditioning apparatus 1 can effectively determine whether the neutral wire of the transformer 2 is grounded.

Figure 4F:
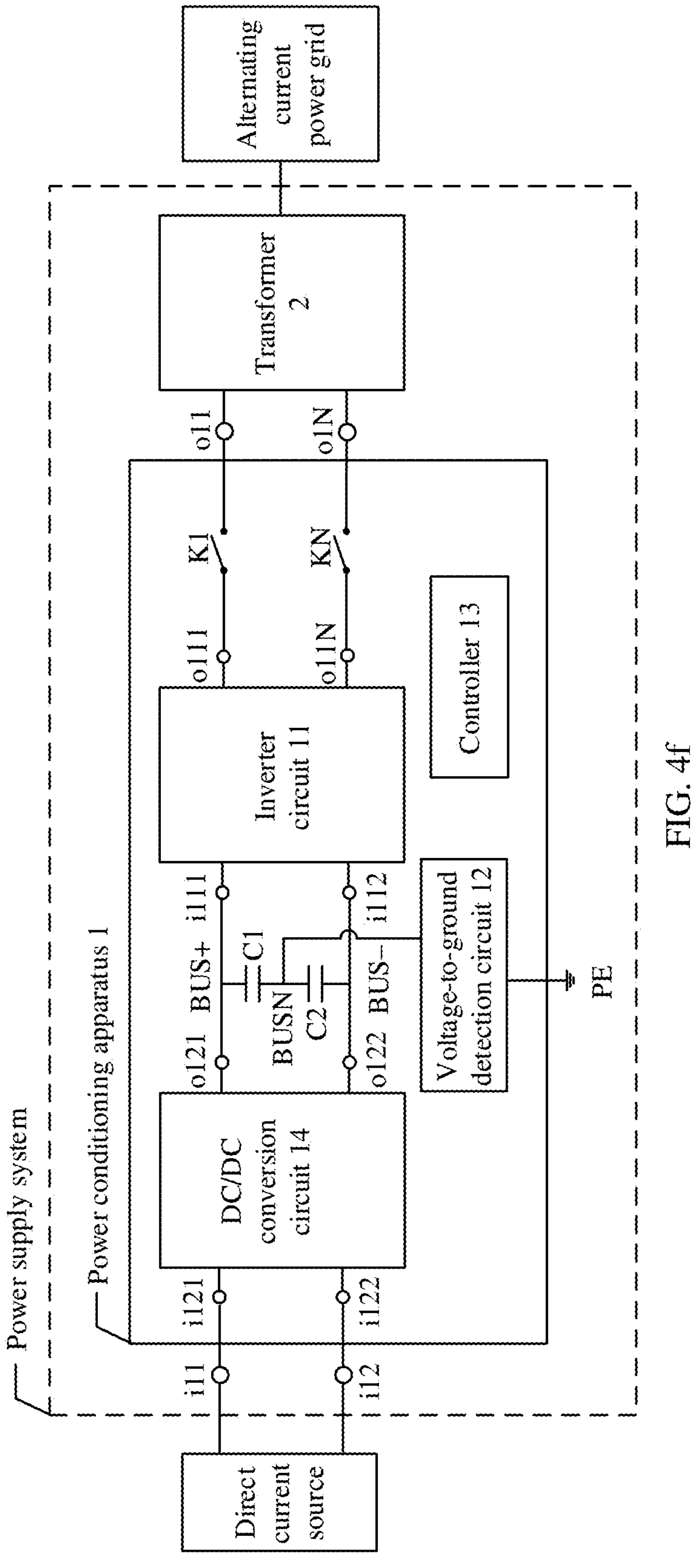
FIG. 4*f* is a schematic of another structure of a power supply system according to the embodiments.

Optionally, the voltage-to-ground detector 12 may alternatively be connected between a bus neutral point BUSN and the reference ground PE. For details, refer to a power supply system shown in FIG. 4*f*. As shown in FIG. 4*f*, the power conditioning apparatus 1 further includes a positive bus capacitor C1 and a negative bus capacitor C2. The positive bus capacitor C1 and the negative bus capacitor C2 are connected in series between the positive direct current bus BUS+ and the negative direct current bus BUS−. A junction between the positive bus capacitor C1 and the negative bus capacitor C2 forms the bus neutral point BUSN. When the voltage-to-ground detector 12 is connected between the bus neutral point BUSN and the reference ground PE, a component forming a loop with the alternating current power grid changes from the alternating current output end o111 to the bus neutral point BUSN in a detection principle according to which the power conditioning apparatus 1 can effectively determine whether the neutral wire of the transformer 2 is grounded.

In this embodiment, the power conditioning apparatus 1 can determine, based on a magnitude relationship between two voltage to ground values that are of the alternating current output end o111 of the inverter circuit 11, the direct current bus, the bus neutral point, or the direct current input end of the power conditioning apparatus 1 and that are obtained by the voltage-to-ground detector 12 through detection before and after an action of the grid-connected switch K1, whether the neutral wire of the transformer 2 is grounded. This detection manner is simple and helps improve detection efficiency. In addition, because the voltage-to-ground detector 12 and the grid-connected switch K1 are both existing circuit components in the power conditioning apparatus 1, no additional circuit component is required in this detection manner, and detection costs can be reduced. Further, a protection measure is taken in time when the neutral wire of the transformer 2 is grounded, and the power conditioning apparatus 1 is started only when the neutral wire of the transformer 2 is not grounded. This can effectively avoid a case in which a fault current damages the power conditioning apparatus 1 due to grounding of the neutral wire of the transformer 2 when a short circuit to ground occurs in a power transmission path on which the power conditioning apparatus 1 is located, to improve reliability of the power conditioning apparatus 1 and therefore improve reliability of the power supply system.

Figure 4G:
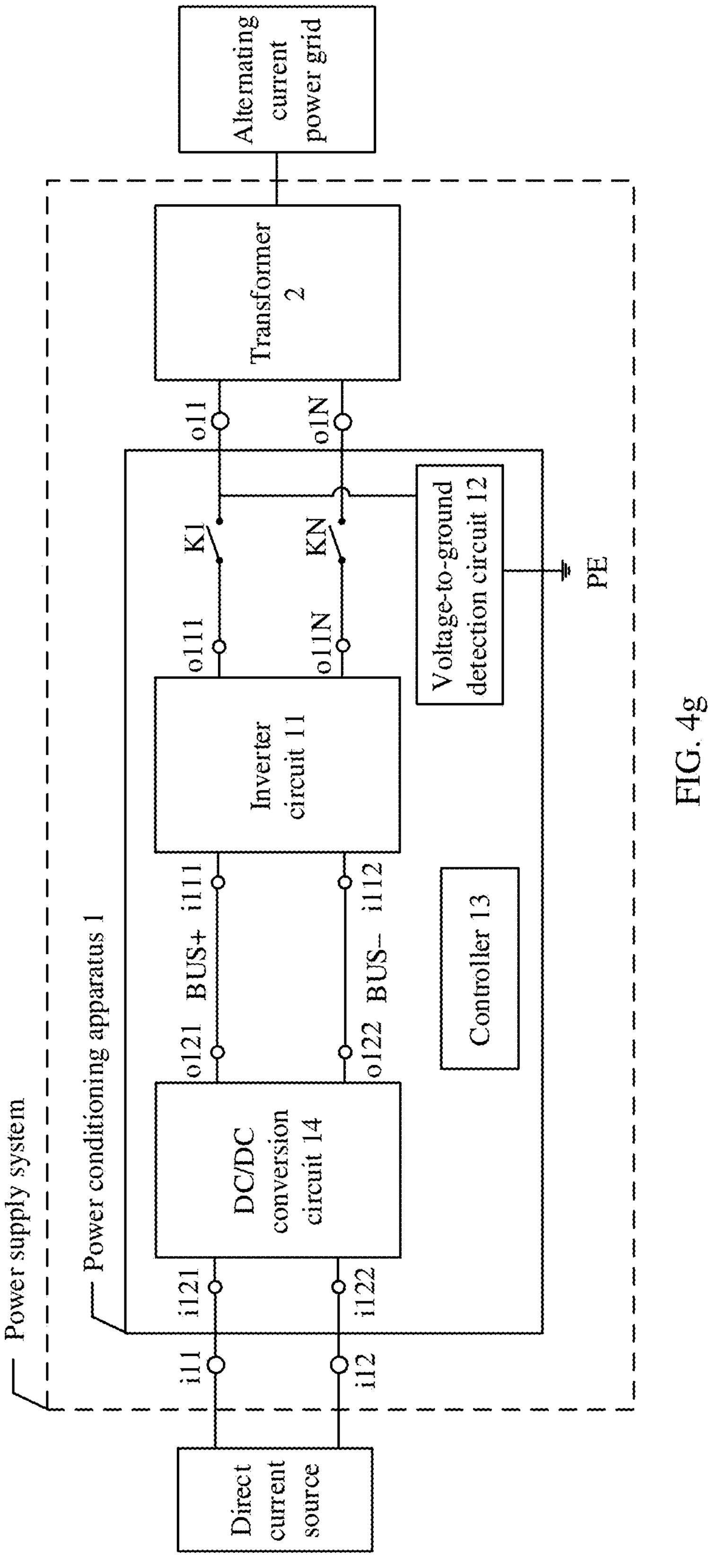
FIG. 4*g* is a schematic of another structure of a power supply system according to the embodiments.

For example, FIG. 4*g* is a schematic of another structure of a power supply system according to the embodiments. As shown in FIG. 4*g*, compared with the power supply systems shown in FIG. 4*a* to FIG. 4*f*, a voltage-to-ground detector 12 in a power supply system shown in FIG. 4*g* is connected between a reference ground PE and an alternating current output end o11 of a power conditioning apparatus 1. Herein, for a specific connection relationship between circuits other than the voltage-to-ground detector 12 in the power supply system shown in FIG. 4*g*, refer to descriptions of corresponding parts in the power supply system shown in FIG. 4*a*. Details are not described herein again.

In an implementation, before the power conditioning apparatus 1 is started, a controller 13 controls a grid-connected switch K1 to be turned off or turned on, and obtains a first voltage value and a second voltage value through the voltage-to-ground detector 12. Herein, for a specific implementation in which the controller 13 obtains the first voltage value and the second voltage value, refer to descriptions of corresponding parts in the power supply system shown in FIG. 4*a*. Details are not described herein again.

After the controller 13 receives the first voltage value and the second voltage value that are sent by the voltage-to-ground detector 12, when a difference between the second voltage value and the first voltage value is less than a second voltage threshold, the controller 13 stops working, or outputs alarm information for grounding of a neutral wire of a transformer 2, or sends alarm information for grounding of a neutral wire of a transformer 2 to an upper-level device or a terminal device.

In addition, after the controller 13 receives the first voltage value and the second voltage value that are sent by the voltage-to-ground detector 12, when the difference between the second voltage value and the first voltage value is greater than or equal to the second voltage threshold, the controller 13 controls the power conditioning apparatus 1 to be started.

It may be understood that, before the power conditioning apparatus 1 is started, neither a DC/DC conversion circuit 14 nor an inverter circuit 11 starts to work. In a case in which the neutral wire of the transformer 2 is not grounded, a ground impedance value that is of the alternating current output end o11 and that exists when the grid-connected switch K1 is turned off is greater than a ground impedance value that is of the alternating current output end o11 and that exists when the grid-connected switch K1 is turned on. Therefore, the first voltage value obtained through detection when the grid-connected switch K1 is turned off is greater than the second voltage value obtained through detection when the grid-connected switch K1 is turned on, so that the difference between the second voltage value and the first voltage value is greater than the second voltage threshold. In a case in which the neutral wire of the transformer 2 is grounded, the ground impedance value that is of the alternating current output end o11 and that exists when the grid-connected switch K1 is turned off is the same as the ground impedance value that is of the alternating current output end o11 and that exists when the grid-connected switch K1 is turned on. Therefore, the first voltage value obtained through detection when the grid-connected switch K1 is turned off and the second voltage value obtained through detection when the grid-connected switch K1 is turned on are basically the same, so that the difference between the second voltage value and the first voltage value is less than the second voltage threshold. Based on this, it can be understood that the power conditioning apparatus 1 can effectively determine, based on a magnitude relationship between two voltage to ground values that are of the power conditioning apparatus 1 and that are obtained by the voltage-to-ground detector 12 through detection before and after an action of the grid-connected switch K1, whether the neutral wire of the transformer 2 is grounded.

In this embodiment, the power conditioning apparatus 1 can determine, based on a magnitude relationship between two voltage to ground values that are of the alternating current output end o11 and that are obtained by the voltage-to-ground detector 12 through detection before and after an action of the grid-connected switch K1, whether the neutral wire of the transformer 2 is grounded. This detection manner is simple and helps improve detection efficiency. In addition, because the voltage-to-ground detector 12 and the grid-connected switch K1 are both existing circuit components in the power conditioning apparatus 1, no additional circuit component is required in this detection manner, and detection costs can be reduced. Additionally, a protection measure is taken in time when the neutral wire of the transformer 2 is grounded, and the power conditioning apparatus 1 is started only when the neutral wire of the transformer 2 is not grounded. This can effectively avoid a case in which a fault current damages the power conditioning apparatus 1 due to grounding of the neutral wire of the transformer 2 when a short circuit to ground occurs in a power transmission path on which the power conditioning apparatus 1 is located, to improve reliability of the power conditioning apparatus 1 and therefore improve reliability of the power supply system.

The power conditioning apparatus 1 provided in the embodiments may be a three-phase power conditioning apparatus other than the single-phase power conditioning apparatuses shown in FIG. 3 to FIG. 4*g*. For details, refer to a power conditioning apparatus 1 in a power supply system shown in FIG. 5 to FIG. 6*g*.

Figure 5:
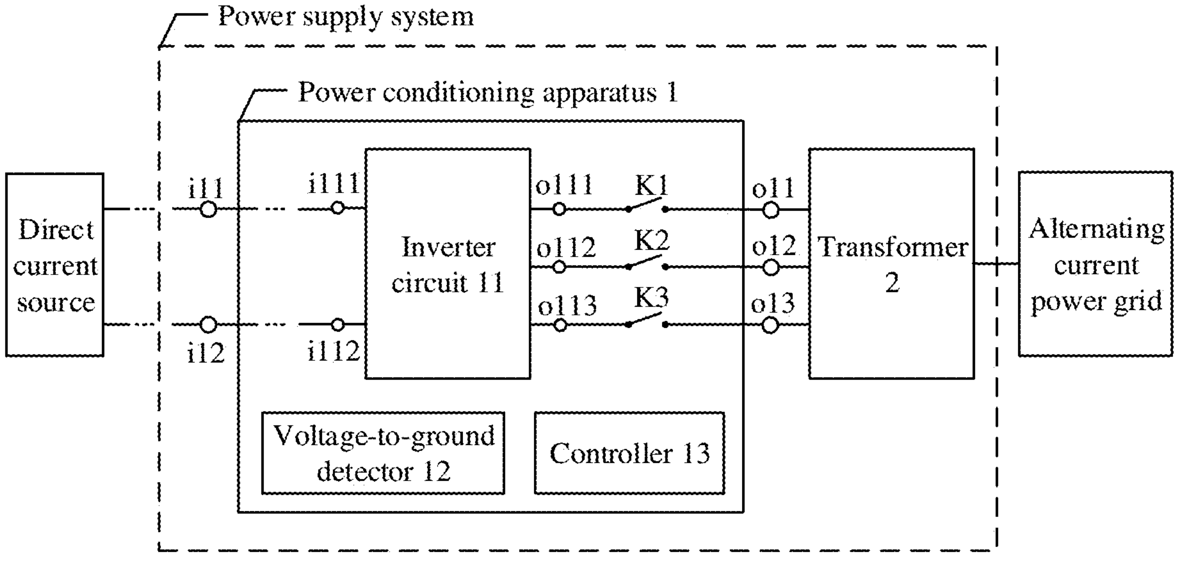
FIG. 5 is a schematic of another structure of a power supply system according to the embodiments.

FIG. 5 is a schematic of another structure of a power supply system according to the embodiments. As shown in FIG. 5, compared with the power conditioning apparatus 1 shown in FIG. 3, a power conditioning apparatus 1 shown in FIG. 5 further includes an alternating current output end o12, an alternating current output end o13, a grid-connected switch K2, and a grid-connected switch K3. Another end of an inverter circuit 11 further includes an alternating current output end o112 and an alternating current output end o113. The alternating current output end o112 of the inverter circuit 11 is connected to the alternating current output end o12 of the power conditioning apparatus 1 through the grid-connected switch K2. The alternating current output end o113 of the inverter circuit 11 is connected to the alternating current output end o13 of the power conditioning apparatus 1 through the grid-connected switch K3. The alternating current output end o12 and the alternating current output end o13 of the power conditioning apparatus 1 are connected to an input end of a transformer 2. Herein, for a specific connection relationship of parts in the power supply system shown in FIG. 5 other than the output end of the inverter circuit 11 and the output end of the power conditioning apparatus 1, refer to descriptions of corresponding parts in the power supply system shown in FIG. 3. Details are not described herein again.

In an implementation, when the grid-connected switch K1 is turned off, a voltage-to-ground detector 12 detects a voltage to ground of the power conditioning apparatus 1 to obtain a first voltage value; and when the grid-connected switch K1 is turned on, the voltage-to-ground detector 12 detects the voltage to ground of the power conditioning apparatus 1 to obtain a second voltage value. Then, a controller 13 obtains the first voltage value and the second voltage value through the voltage-to-ground detector 12. The controller 13 outputs alarm information for grounding of a neutral wire of the transformer 2 or stops working when a difference between the second voltage value and the first voltage value falls within a preset voltage range.

In this embodiment, a difference that is between the second voltage value and the first voltage value and that exists when a neutral wire of the transformer 2 is grounded varies greatly from a difference that is between the second voltage value and the first voltage value and that exists when the neutral wire of the transformer 2 is not grounded. Therefore, the power conditioning apparatus 1 can determine, based on a magnitude relationship between two voltage to ground values that are of the power conditioning apparatus 1 and that are obtained by the voltage-to-ground detector 12 through detection before and after an action of the grid-connected switch K1, whether the neutral wire of the transformer 2 is grounded. This detection manner is simple and helps improve detection efficiency. In addition, because the voltage-to-ground detector 12 and the grid-connected switch K1 are both existing circuit components in the power conditioning apparatus 1, no additional circuit component is required in this detection manner, and detection costs can be reduced. Further, a protection measure is taken on the power conditioning apparatus 1 in time when the neutral wire of the transformer 2 is grounded. This can effectively avoid a case in which a fault current damages the power conditioning apparatus 1 due to grounding of the neutral wire of the transformer 2 when a short circuit to ground occurs in a power transmission path on which the power conditioning apparatus 1 is located, to improve reliability of the power conditioning apparatus 1 and therefore improve reliability of the power supply system.

Figure 6A:
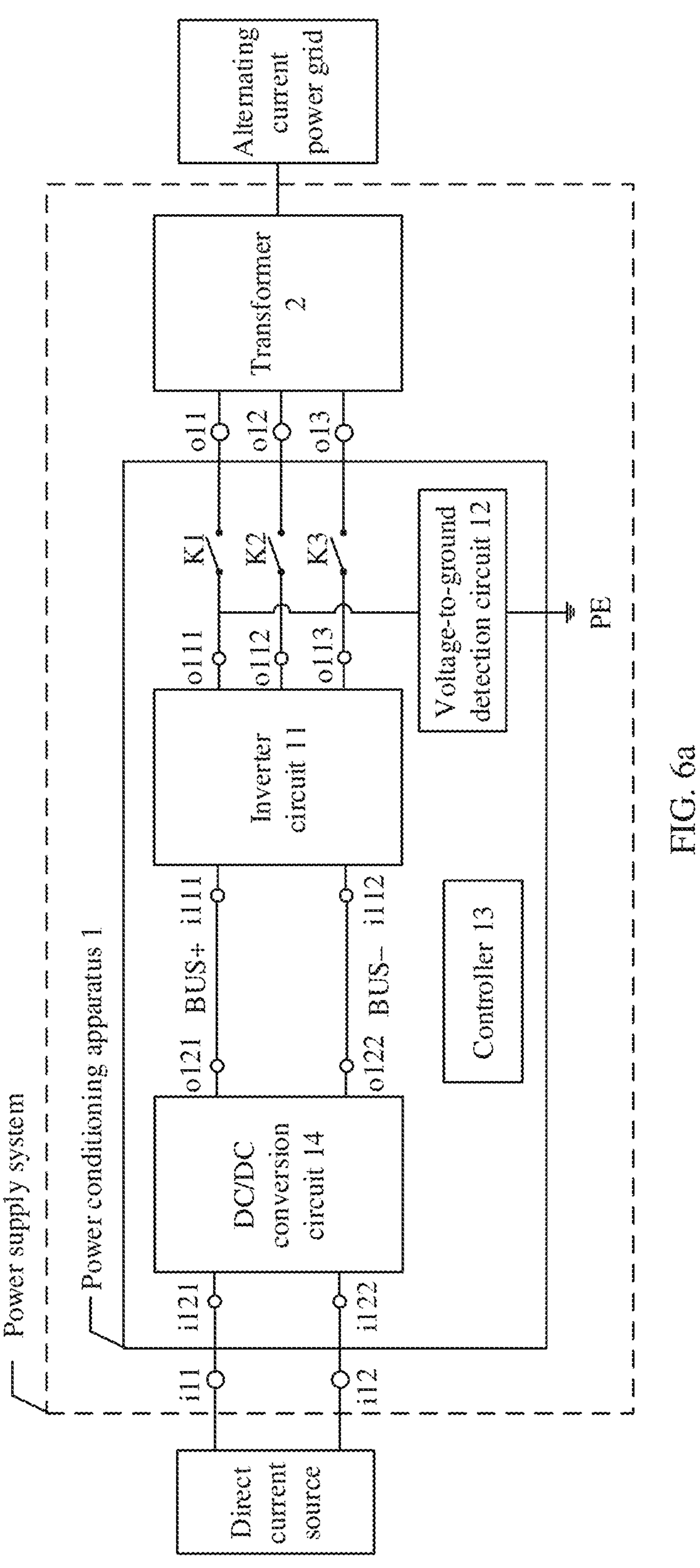
FIG. 6*a* is a schematic of another structure of a power supply system according to the embodiments.
Figure 6B:
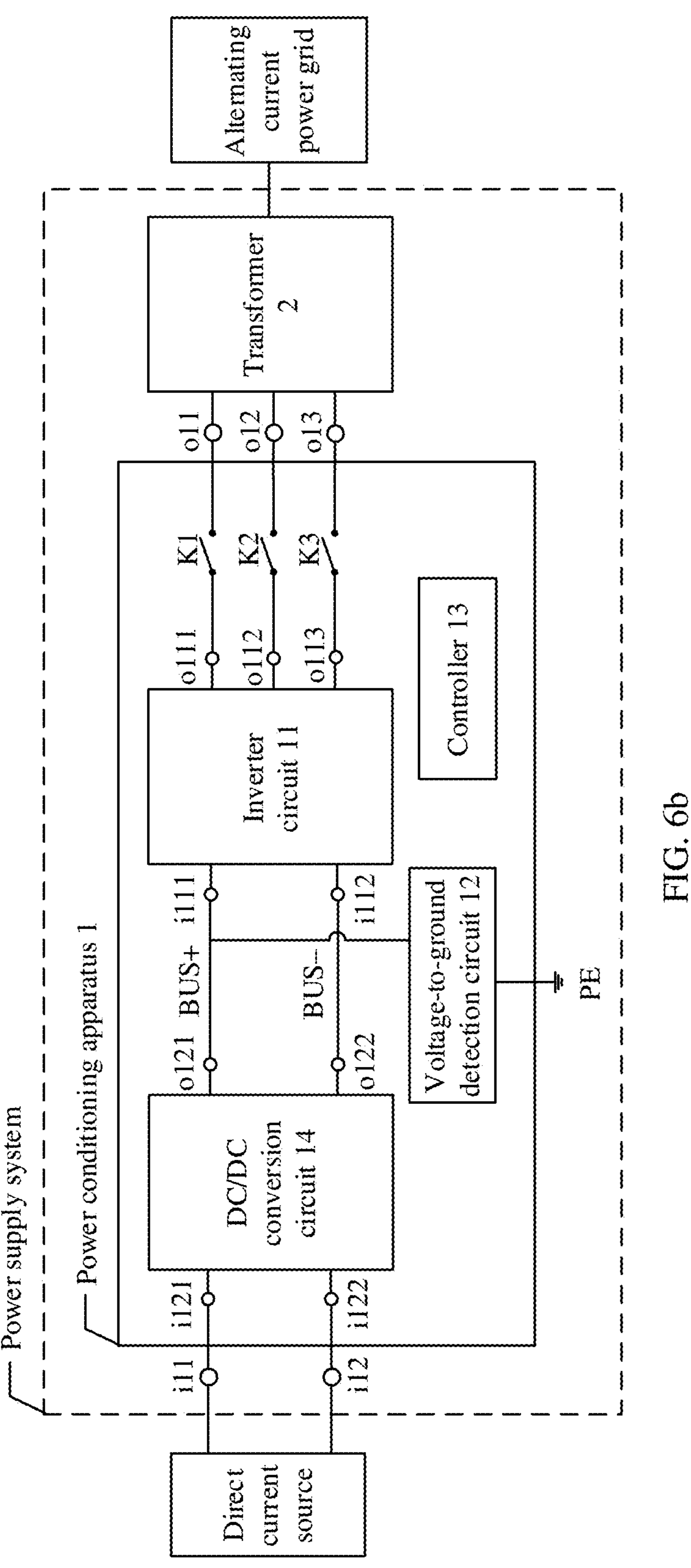
FIG. 6*b* is a schematic of another structure of a power supply system according to the embodiments.
Figure 6C:
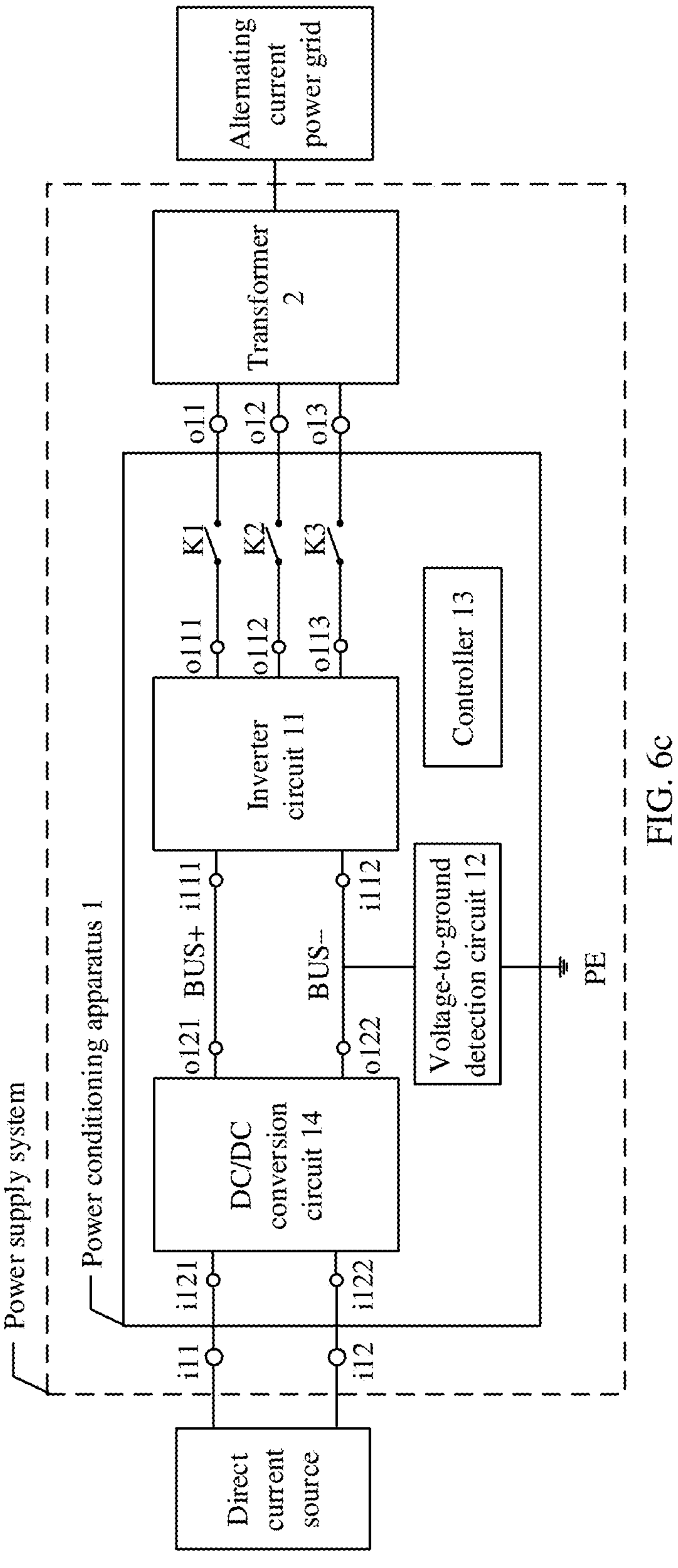
FIG. 6*c* is a schematic of another structure of a power supply system according to the embodiments.
Figure 6D:
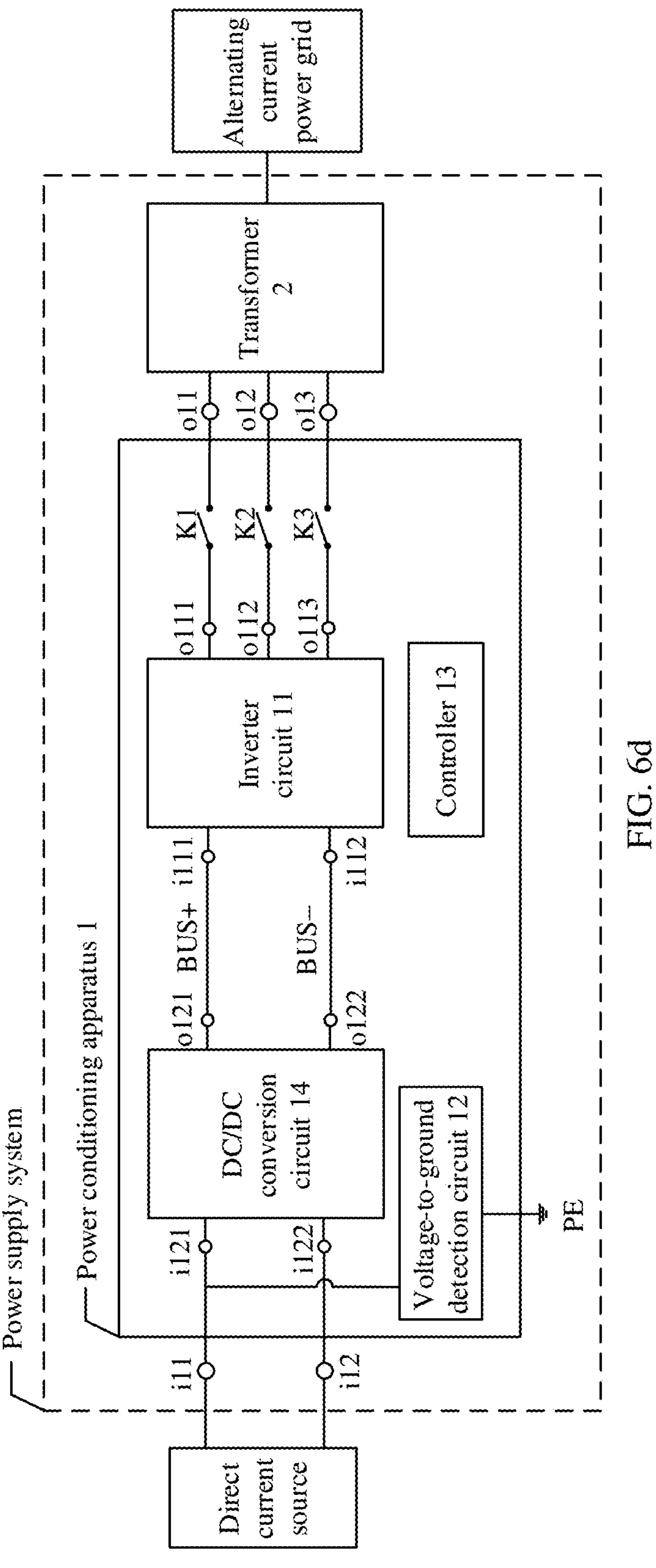
FIG. 6*d* is a schematic of another structure of a power supply system according to the embodiments.
Figure 6E:
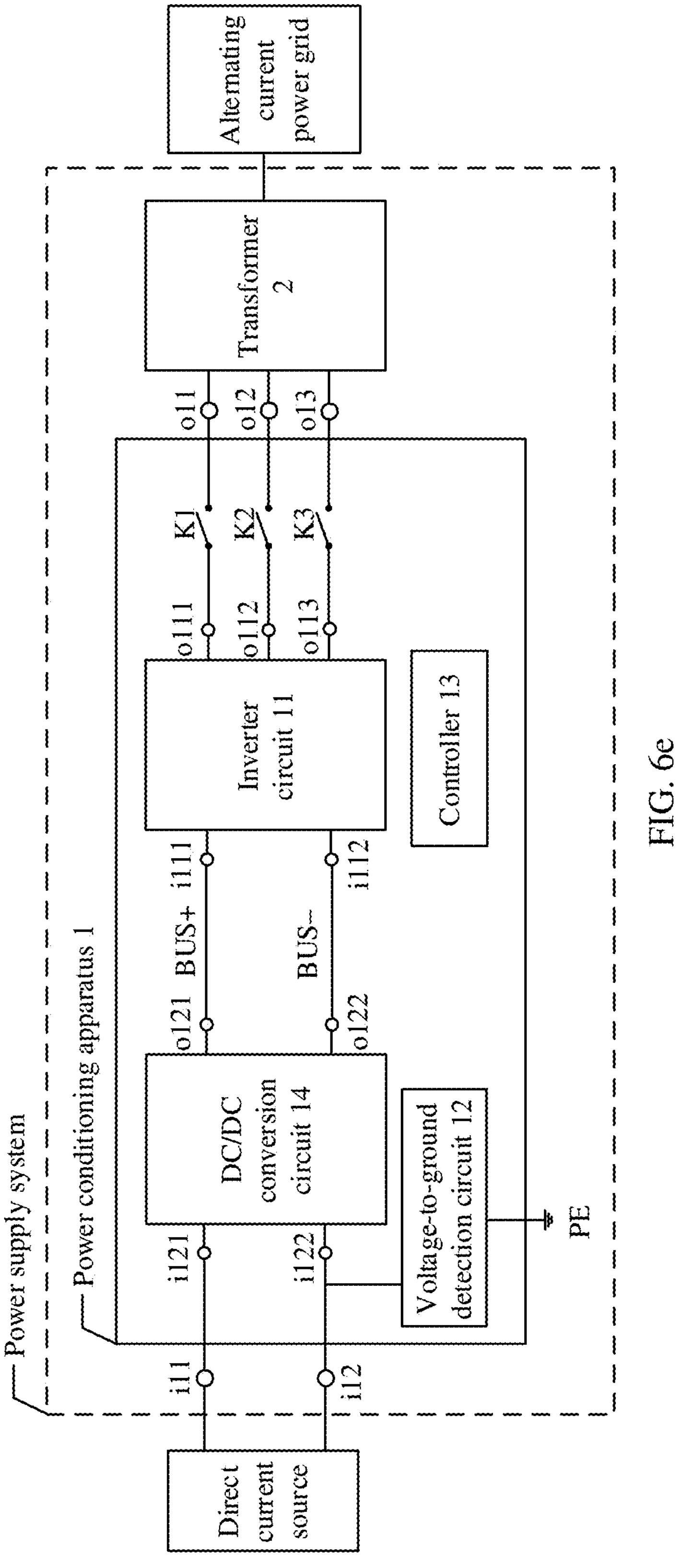
FIG. 6*e* is a schematic of another structure of a power supply system according to the embodiments.
Figure 6F:
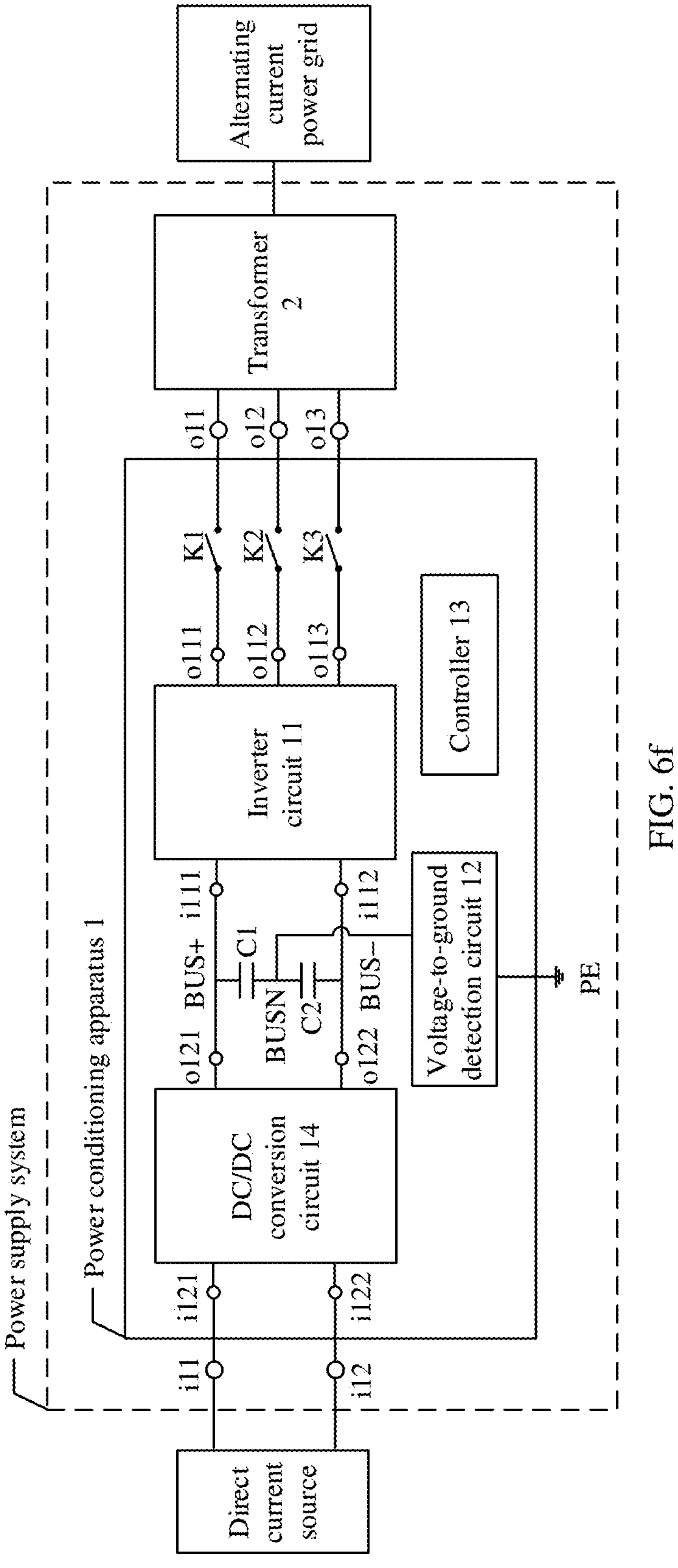
FIG. 6*f* is a schematic of another structure of a power supply system according to the embodiments.

For example, FIG. 6*a* is a schematic of another structure of a power supply system according to the embodiments. As shown in FIG. 6*a*, compared with the power conditioning apparatus 1 shown in FIG. 4*a*, a power conditioning apparatus 1 shown in FIG. 6*a* further includes an alternating current output end o12, an alternating current output end o13, a grid-connected switch K2, and a grid-connected switch K3. Another end of an inverter circuit 11 further includes an alternating current output end o112 and an alternating current output end o113. Herein, for a specific connection relationship of the output end of the inverter circuit 11 and the output end of the power conditioning apparatus 1 shown in FIG. 6*a*, refer to descriptions of corresponding parts in the power supply system shown in FIG. 5. Details are not described herein again.

In an implementation, before the power conditioning apparatus 1 is started, a controller 13 controls a grid-connected switch K1 to be turned off or turned on, and obtains a first voltage value and a second voltage value through a voltage-to-ground detector 12. Herein, for a specific implementation in which the controller 13 obtains the first voltage value and the second voltage value, refer to descriptions of corresponding parts in the power supply system shown in FIG. 4*a*. Details are not described herein again.

After the controller 13 receives the first voltage value and the second voltage value that are sent by the voltage-to-ground detector 12, when a difference between the second voltage value and the first voltage value is less than a second voltage threshold, the controller 13 outputs alarm information for grounding of a neutral wire of a transformer 2, or sends alarm information for grounding of a neutral wire of a transformer 2 to an upper-level device or a terminal device, or stops working.

In addition, after the controller 13 receives the first voltage value and the second voltage value that are sent by the voltage-to-ground detector 12, when the difference between the second voltage value and the first voltage value is greater than or equal to the second voltage threshold, the controller 13 controls the power conditioning apparatus 1 to be started.

Optionally, the voltage-to-ground detector 12 may alternatively be connected between a positive direct current bus BUS+ and a reference ground PE. For details, refer to a power supply system shown in FIG. 6*b*. Optionally, the voltage-to-ground detector 12 may alternatively be connected between a negative direct current bus BUS− and the reference ground PE. For details, refer to a power supply system shown in FIG. 6*c*. Optionally, the voltage-to-ground detector 12 may alternatively be connected between the reference ground PE and a direct current input end i11 of the power conditioning apparatus 1. For details, refer to a power supply system shown in FIG. 6*d*. Optionally, the voltage-to-ground detector 12 may alternatively be connected between the reference ground PE and a direct current input end i12 of the power conditioning apparatus 1. For details, refer to a power supply system shown in FIG. 6*e*. Optionally, the voltage-to-ground detector 12 may alternatively be connected between a bus neutral point BUSN of the power conditioning apparatus 1 and the reference ground PE. For details, refer to a power supply system shown in FIG. 6*f*. Herein, the power supply systems shown in FIG. 6*a* to FIG. 6*f* may effectively determine whether a neutral wire of the transformer 2 is grounded. Refer to descriptions of corresponding parts in the power supply systems shown in FIG. 4*a* to FIG. 4*f*. Details are not described herein again.

In this embodiment, the power conditioning apparatus 1 can determine, based on a magnitude relationship between two voltage to ground values that are of the alternating current output end o111 of the inverter circuit 11, the direct current bus, the bus neutral point, or the direct current input end of the power conditioning apparatus 1 and that are obtained by the voltage-to-ground detector 12 through detection before and after an action of the grid-connected switch K1, whether the neutral wire of the transformer 2 is grounded. This detection manner is simple and helps improve detection efficiency. In addition, because the voltage-to-ground detector 12 and the grid-connected switch K1 are both existing circuit components in the power conditioning apparatus 1, no additional circuit component is required in this detection manner, and detection costs can be reduced. Also, a protection measure is taken in time when the neutral wire of the transformer 2 is grounded, and the power conditioning apparatus 1 is started only when the neutral wire of the transformer 2 is not grounded. This can effectively avoid a case in which a fault current damages the power conditioning apparatus 1 due to grounding of the neutral wire of the transformer 2 when a short circuit to ground occurs in a power transmission path on which the power conditioning apparatus 1 is located, to improve reliability of the power conditioning apparatus 1 and therefore improve reliability of the power supply system.

Figure 6G:
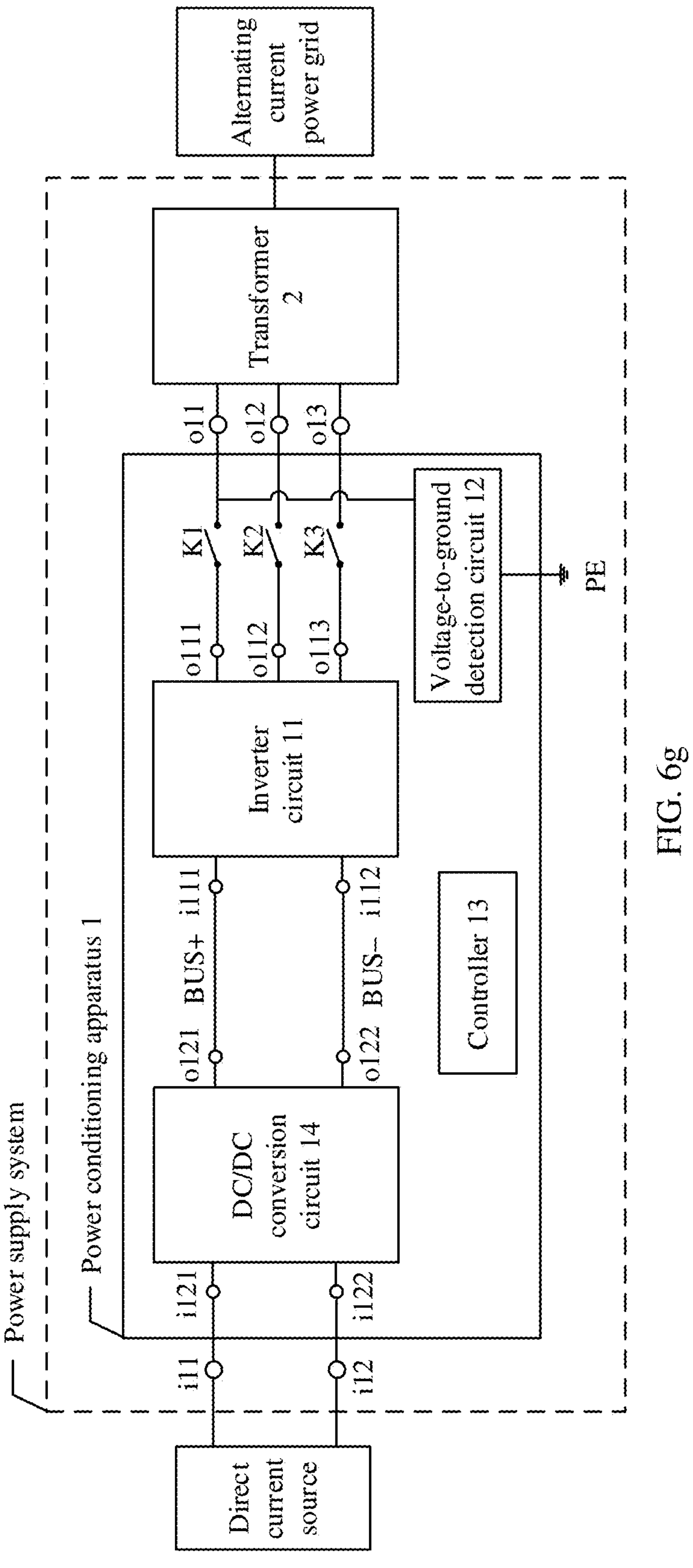
FIG. 6*g* is a schematic of another structure of a power supply system according to the embodiments.

For example, FIG. 6*g* is a schematic of another structure of a power supply system according to the embodiments. As shown in FIG. 6*g*, compared with the power supply systems shown in FIG. 6*a* to FIG. 6*f*, a voltage-to-ground detector 12 in a power supply system shown in FIG. 6*g* is connected between a reference ground PE and an alternating current output end o11 of a power conditioning apparatus 1. Herein, for a specific connection relationship between circuits other than the voltage-to-ground detector 12 in the power supply system shown in FIG. 6*g*, refer to descriptions of corresponding parts in the power supply system shown in FIG. 6*a*. Details are not described herein again.

In an implementation, before the power conditioning apparatus 1 is started, a controller 13 controls a grid-connected switch K1 to be turned off or turned on, and obtains a first voltage value and a second voltage value through the voltage-to-ground detector 12. Herein, for a specific implementation in which the controller 13 obtains the first voltage value and the second voltage value, refer to descriptions of corresponding parts in the power supply system shown in FIG. 4*a*. Details are not described herein again.

After the controller 13 receives the first voltage value and the second voltage value that are sent by the voltage-to-ground detector 12, when a difference between the second voltage value and the first voltage value is less than a second voltage threshold, the controller 13 outputs alarm information for grounding of a neutral wire of a transformer 2, or sends alarm information for grounding of a neutral wire of a transformer 2 to an upper-level device or a terminal device, or stops working.

In addition, after the controller 13 receives the first voltage value and the second voltage value that are sent by the voltage-to-ground detector 12, when the difference between the second voltage value and the first voltage value is greater than or equal to the second voltage threshold, the controller 13 controls the power conditioning apparatus 1 to be started.

Herein, the power supply systems shown in FIG. 6*g* may effectively determine whether a neutral wire of the transformer 2 is grounded. Refer to descriptions of corresponding parts in the power supply systems shown in FIG. 4*g*. Details are not described herein again.

In this embodiment, the power conditioning apparatus 1 can determine, based on a magnitude relationship between two voltage to ground values that are of the alternating current output end o11 and that are obtained by the voltage-to-ground detector 12 through detection before and after an action of the grid-connected switch K1, whether the neutral wire of the transformer 2 is grounded. This detection manner is simple and helps improve detection efficiency. In addition, because the voltage-to-ground detector 12 and the grid-connected switch K1 are both existing circuit components in the power conditioning apparatus 1, no additional circuit component is required in this detection manner, and detection costs can be reduced. Further, a protection measure is taken in time when the neutral wire of the transformer 2 is grounded, and the power conditioning apparatus 1 is started only when the neutral wire of the transformer 2 is not grounded. This can effectively avoid a case in which a fault current damages the power conditioning apparatus 1 due to grounding of the neutral wire of the transformer 2 when a short circuit to ground occurs in a power transmission path on which the power conditioning apparatus 1 is located, to improve reliability of the power conditioning apparatus 1 and therefore improve reliability of the power supply system.

It should be noted that the power supply systems shown in FIG. 5 to FIG. 6*g* are all described by using an example in which the grid-connected switch is K1. In the embodiments, the grid-connected switch may alternatively be K2 or K3. When the grid-connected switch is K2, the alternating current output end of the power conditioning apparatus 1 changes from o11 to o12, and the alternating current output end of the inverter circuit 11 changes from o111 to o112. When the grid-connected switch is K3, the alternating current output end of the power conditioning apparatus 1 changes from o11 to o13, and the alternating current output end of the inverter circuit 11 changes from o111 to o113. A working principle of a power supply system when the grid-connected switch is K2 or K3 is the same as a working principle of the power supply system when the grid-connected switch is K1. Details are not described herein again. Working principles of the power supply systems shown in FIG. 4*a* to FIG. 4*g* and FIG. 6*a* to FIG. 6*g* are also applicable to a power supply system in which the power conditioning apparatus does not include the DC/DC conversion circuit 14. Details are not displayed and described herein again. In addition, the first voltage value and the second voltage value in the embodiments include a direct current voltage component or an alternating current voltage component.

Figure 7:
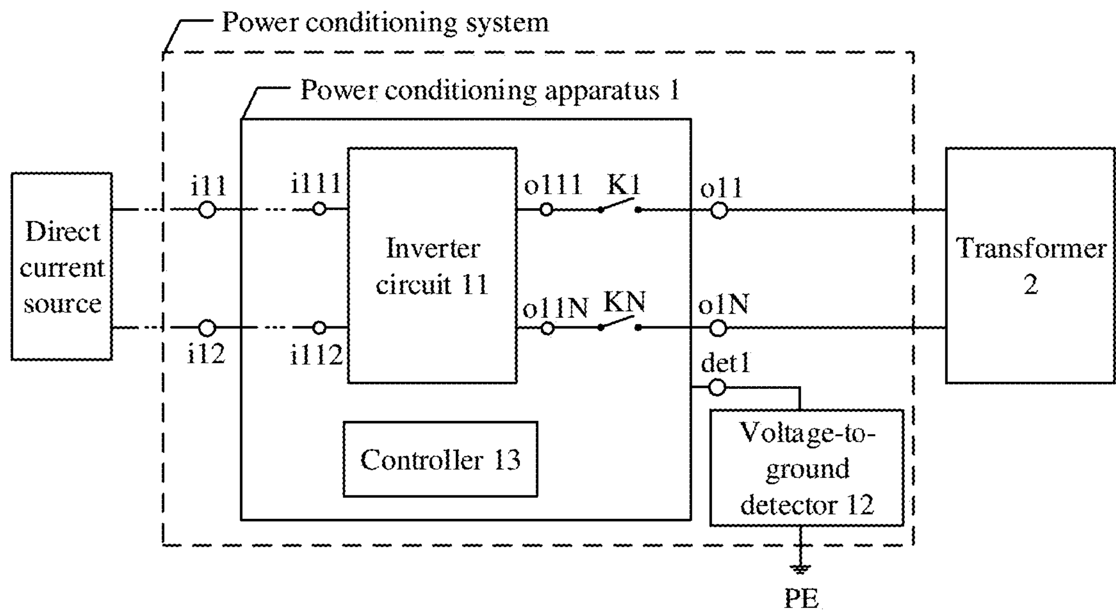
FIG. 7 is a schematic of a structure of a power conditioning system according to the embodiments.

FIG. 7 is a schematic of a structure of a power conditioning system according to the embodiments. As shown in FIG. 7, the power conditioning system includes a power conditioning apparatus 1 and a voltage-to-ground detector 12. Compared with the power conditioning apparatuses 1 in the power supply systems shown in FIG. 3 to FIG. 6*g*, the power conditioning apparatus 1 shown in FIG. 7 does not include the voltage-to-ground detector 12, and the power conditioning apparatus 1 further includes a voltage detection end det1. The voltage-to-ground detector 12 is connected between the voltage detection end det1 and a reference ground PE. The voltage-to-ground detector 12 is configured to: when a grid-connected switch K1 is turned off, detect a voltage to ground of the voltage detection end det1 to obtain a first voltage value; and when the grid-connected switch K1 is turned on, detect a voltage to ground of the voltage detection end det1 to obtain a second voltage value.

Regardless of whether the voltage-to-ground detector is located inside the power conditioning apparatus 1 or outside the power conditioning apparatus 1, a working principle of the power conditioning apparatus 1 remains unchanged. Therefore, the working principle of the power conditioning system is not described herein again.

For example, the voltage detection end det1 is connected to an alternating current output end o111 of an inverter circuit 11, corresponding to a structure in which the voltage-to-ground detector 12 is located outside the power conditioning apparatus 1 in the power supply system shown in FIG. 4*a* and FIG. 6*a*. Optionally, the voltage detection end det1 is connected to a positive direct current bus BUS+, corresponding to a structure in which the voltage-to-ground detector 12 is located outside the power conditioning apparatus 1 in the power supply system shown in FIG. 4*b* and FIG. 6*b*. Optionally, the voltage detection end det1 is connected to a negative direct current bus BUS−, corresponding to a structure in which the voltage-to-ground detector 12 is located outside the power conditioning apparatus 1 in the power supply system shown in FIG. 4*c* and FIG. 6*c*. Optionally, the voltage detection end det1 is a direct current input end il1, corresponding to a structure in which the voltage-to-ground detector 12 is located outside the power conditioning apparatus 1 in the power supply system shown in FIG. 4*d* and FIG. 6*d*. Optionally, the voltage detection end det1 is a direct current input end i12, corresponding to a structure in which the voltage-to-ground detector 12 is located outside the power conditioning apparatus 1 in the power supply system shown in FIG. 4*e* and FIG. 6*e*. Optionally, the voltage detection end det1 is connected to a bus neutral point, corresponding to a structure in which the voltage-to-ground detector 12 is located outside the power conditioning apparatus 1 in the power supply system shown in FIG. 4*f* and FIG. 6*f*. Optionally, the voltage detection end det1 is an alternating current output end o11 of the power conditioning apparatus 1, corresponding to a structure in which the voltage-to-ground detector 12 is located outside the power conditioning apparatus 1 in the power supply system shown in FIG. 4*g* and FIG. 6*g*.

In this embodiment, a difference that is between the second voltage value and the first voltage value and that exists when a neutral wire of a transformer 2 is grounded varies greatly from a difference that is between the second voltage value and the first voltage value and that exists when the neutral wire of the transformer 2 is not grounded. Therefore, the power conditioning system can effectively determine, based on a magnitude relationship between two voltage to ground values that are of the voltage detection end det1 and that are obtained by the voltage-to-ground detector 12 through detection before and after an action of the grid-connected switch K1, whether the neutral wire of the transformer 2 is grounded. This detection manner is simple and helps improve detection efficiency. In addition, a protection measure is taken in time when the neutral wire of the transformer 2 is grounded, and the power conditioning apparatus 1 is started only when the neutral wire of the transformer 2 is not grounded. This can effectively avoid a case in which a fault current damages the power conditioning system due to grounding of the neutral wire of the transformer 2 when a short circuit to ground occurs in a power transmission path on which the power conditioning apparatus 1 is located, to improve reliability of the power conditioning system.

Figure 8:
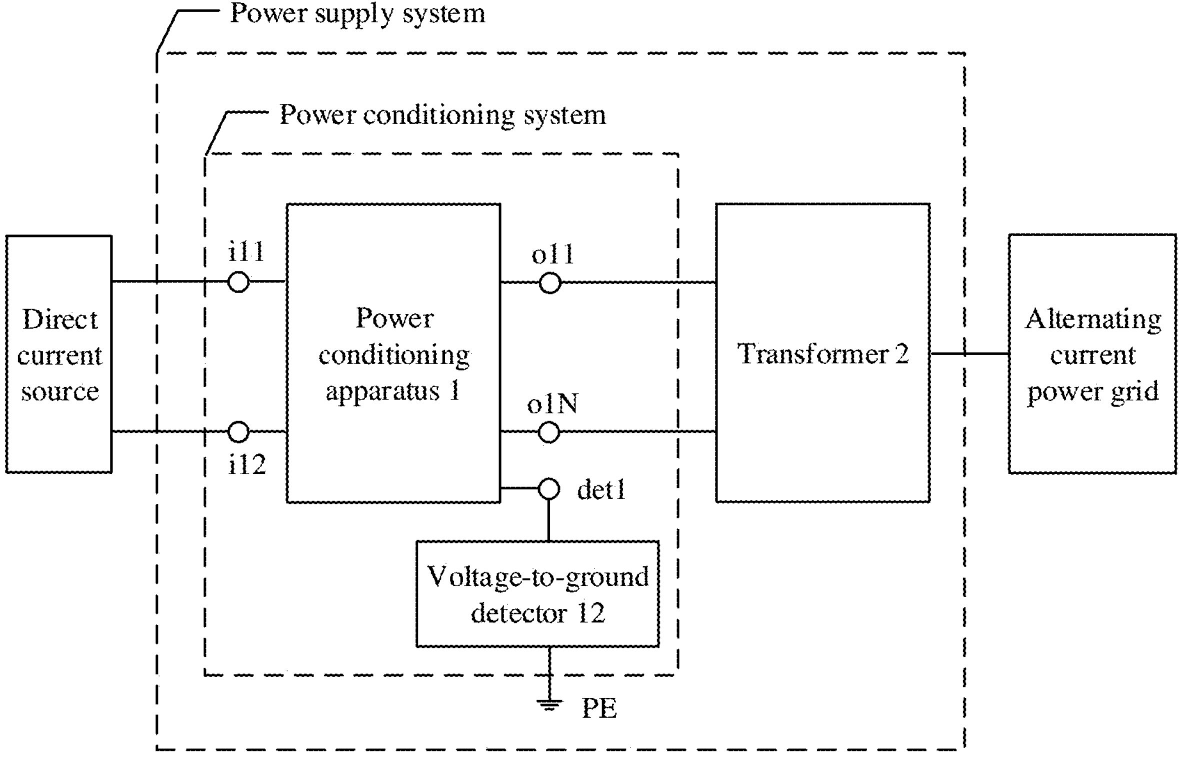
FIG. 8 is a schematic of another structure of a power supply system according to the embodiments.

Based on the power conditioning system shown in FIG. 7, the embodiments further provide a power supply system. For details, refer to the power supply system shown in FIG. 8. As shown in FIG. 8, the power supply system includes a power conditioning system and a transformer 2. Herein, for a circuit structure of the power conditioning system, a connection relationship between the power conditioning system and the transformer 2, and a working principle of the power conditioning system, refer to descriptions of corresponding parts in embodiment shown in FIG. 7. Details are not described herein again.

In this embodiment, a difference that is between a second voltage value and a first voltage value and that exists when a neutral wire of the transformer 2 is grounded varies greatly from a difference that is between the second voltage value and the first voltage value and that exists when the neutral wire of the transformer 2 is not grounded. Therefore, the power conditioning system can effectively determine, based on a magnitude relationship between two voltage to ground values that are of the voltage detection end det1 and that are obtained by the voltage-to-ground detector 12 through detection before and after an action of a grid-connected switch, whether the neutral wire of the transformer 2 is grounded. This detection manner is simple and helps improve detection efficiency. In addition, a protection measure is taken in time when the neutral wire of the transformer 2 is grounded, and the power conditioning apparatus 1 is started only when the neutral wire of the transformer 2 is not grounded. This can effectively avoid a case in which a fault current damages the power supply system due to grounding of the neutral wire of the transformer 2 when a short circuit to ground occurs in a power transmission path on which the power conditioning apparatus 1 is located, to improve reliability of the power supply system.

The foregoing descriptions are merely specific implementations of the embodiments, but are not intended to limit their scope. Any variation or replacement readily figured out by a person skilled in the art shall fall within the scope of the embodiments.

The invention claimed is:

1. A power supply system comprising:

a power conditioning apparatus comprising:

a direct current input end configured to connect to a direct current source;

an inverter circuit, wherein a first end of the inverter circuit is configured to connect to the direct current input end;

at least one grid-connected switch, a voltage-to-ground detector, and at least one alternating current output end, wherein a second end of the inverter circuit is configured to connect to the at least one alternating current output end through the at least one grid-connected switch;

a transformer, wherein an output end of the transformer is configured to connect to a power grid, and the at least one alternating current output end is configured to connect to an input end of the transformer; and a controller, wherein;

the voltage-to-ground detector is configured to:

when the at least one grid-connected switch is turned off, detect a voltage to ground of the power conditioning apparatus to obtain a first voltage value; and when the at least one grid-connected switch is turned on, detect the voltage to ground of the power conditioning apparatus to obtain a second voltage value; and the controller is configured to:

output alarm information for grounding of a neutral wire of the transformer; or control the power conditioning apparatus to stop working when a difference between the second voltage value and the first voltage value falls within a preset voltage range.

2. The power supply system according to claim 1, wherein the voltage-to-ground detector is connected between a reference ground, the second end of the inverter circuit connected to the at least one grid-connected switch; and outputting the alarm information for grounding of the neutral wire of the transformer or controlling the power conditioning apparatus to stop working when the difference between the second voltage value and the first voltage value falls within the preset voltage range further comprises:

outputting the alarm information for grounding of the neutral wire of the transformer or controlling the power conditioning apparatus to stop working when the difference between the second voltage value and the first voltage value is greater than a first voltage threshold.

3. The power supply system according to claim 2, wherein the controller is further configured to:

before the power conditioning apparatus is started, control when the at least one grid-connected switch to be turned off or turned on, so that the voltage-to-ground detector obtains the first voltage value or the second voltage value through detection.

4. The power supply system according to claim 2, wherein the controller is further configured to:

when the difference between the second voltage value and the first voltage value does not fall within the preset voltage range, control the power conditioning apparatus to be started.

5. The power supply system according to claim 1, wherein the voltage-to-ground detector is connected between a reference ground and one alternating current output end connected to the at least one grid-connected switch; and outputting the alarm information for grounding of the neutral wire of the transformer or controlling the power conditioning apparatus to stop working when the difference between the second voltage value and the first voltage value falls within the preset voltage range further comprises:

outputting the alarm information for grounding of the neutral wire of the transformer or controlling the power conditioning apparatus to stop working when the difference between the second voltage value and the first voltage value is less than a second voltage threshold.

6. The power supply system according to claim 5, wherein the controller is further configured to:

before the power conditioning apparatus is started, control when the at least one grid-connected switch to be turned off or turned on, so that the voltage-to-ground detector obtains the first voltage value or the second voltage value through detection.

7. The power supply system according to claim 5, wherein the controller is further configured to:

when the difference between the second voltage value and the first voltage value does not fall within the preset voltage range, control the power conditioning apparatus to be started.

8. The power supply system according to claim 1, wherein the power conditioning apparatus further comprises:

a direct current bus, the end of the inverter circuit is connected to the direct current input end of the power conditioning apparatus through the direct current bus, and the voltage-to-ground detector is connected between the direct current bus and a reference ground; and outputting the alarm information for grounding of the neutral wire of the transformer or controlling the power conditioning apparatus to stop working when the difference between the second voltage value and the first voltage value falls within the preset voltage range further comprises:

outputting the alarm information for grounding of the neutral wire of the transformer or controlling the power conditioning apparatus to stop working when the difference between the second voltage value and the first voltage value is greater than a first voltage threshold.

9. The power supply system according to claim 8, wherein the controller is further configured to:

before the power conditioning apparatus is started, control when the at least one grid-connected switch to be turned off or turned on, so that the voltage-to-ground detector obtains the first voltage value or the second voltage value through detection.

10. The power supply system according to claim 8, wherein the controller is further configured to:

when the difference between the second voltage value and the first voltage value does not fall within the preset voltage range, control the power conditioning apparatus to be started.

11. The power supply system according to claim 1, wherein the power conditioning apparatus further comprises:

a positive direct current bus, a negative direct current bus, a positive bus capacitor, and a negative bus capacitor, the end of the inverter circuit is connected to the direct current input end of the power conditioning apparatus through the positive direct current bus and the negative direct current bus separately, the positive bus capacitor and the negative bus capacitor are connected in series between the positive direct current bus and the negative direct current bus, and the voltage-to-ground detector is connected between a reference ground and a junction between the positive bus capacitor and the negative bus capacitor; and outputting the alarm information for grounding of the neutral wire of the transformer or controlling the power conditioning apparatus to stop working when the difference between the second voltage value and the first voltage value falls within the preset voltage range comprises:

outputting the alarm information for grounding of the neutral wire of the transformer or controlling the power conditioning apparatus to stop working when the difference between the second voltage value and the first voltage value is greater than a first voltage threshold.

12. The power supply system according to claim 11, wherein the controller is further configured to:

before the power conditioning apparatus is started, control when the at least one grid-connected switch to be turned off or turned on, so that the voltage-to-ground detector obtains the first voltage value or the second voltage value through detection.

13. The power supply system according to claim 11, wherein the controller is further configured to:

when the difference between the second voltage value and the first voltage value does not fall within the preset voltage range, control the power conditioning apparatus to be started.

14. The power supply system according to claim 1, wherein the voltage-to-ground detector is connected between the direct current input end of the power conditioning apparatus and a reference ground; and outputting the alarm information for grounding of the neutral wire of the transformer or controlling the power conditioning apparatus to stop working when the difference between the second voltage value and the first voltage value falls within the preset voltage range further comprises:

outputting the alarm information for grounding of the neutral wire of the transformer or controlling the power conditioning apparatus to stop working when the difference between the second voltage value and the first voltage value is greater than a first voltage threshold.

15. The power supply system according to claim 14, wherein the controller is further configured to:

before the power conditioning apparatus is started, control when the at least one grid-connected switch to be turned off or turned on, so that the voltage-to-ground detector obtains the first voltage value or the second voltage value through detection.

16. The power supply system according to claim 1, wherein the controller is further configured to:

before the power conditioning apparatus is started, control when the at least one grid-connected switch to be turned off or turned on, so that the voltage-to-ground detector obtains the first voltage value or the second voltage value through detection.

17. The power supply system according to claim 1, wherein the controller is further configured to:

when the difference between the second voltage value and the first voltage value does not fall within the preset voltage range, control the power conditioning apparatus to be started.

18. The power supply system according to claim 1, wherein the power conditioning apparatus further comprises:

a DC/DC conversion circuit and the direct current bus, the end of the inverter circuit is connected to an end of the DC/DC conversion circuit through the direct current bus, and another end of the DC/DC conversion circuit is connected to the direct current input end of the power conditioning apparatus.

19. A power conditioning apparatus comprising:

a direct current input end configured to connect to a direct current source;

an inverter circuit, wherein a first end of the inverter circuit is configured to connect to the direct current input end;

at least one grid-connected switch, a controller, a voltage-to-ground detector, and at least one alternating current output end configured to connect to a transformer, wherein a second end of the inverter circuit is configured to connect to the at least one alternating current output end through the at least one grid-connected switch; and the voltage-to-ground detector is configured to:

when the at least one grid-connected switch is turned off, detect a voltage to ground of the power conditioning apparatus to obtain a first voltage value; and when the at least one grid-connected switch is turned on, detect the voltage to ground of the power conditioning apparatus to obtain a second voltage value; and the controller is configured to:

output alarm information for grounding of a neutral wire of the transformer; or control the power conditioning apparatus to stop working when a difference between the second voltage value and the first voltage value falls within a preset voltage range.

20. A power conditioning system comprising:

a power conditioning apparatus comprising:

a direct current input end configured to connect to a direct current source;

an inverter circuit, wherein a first end of the inverter circuit is configured to connect to the direct current input end;

at least one grid-connected switch, a controller, at least one alternating current output end configured to connect to a transformer, wherein a second end of the inverter circuit is configured to connect to the at least one alternating current output end through the at least one grid-connected switch; and a voltage detection end; and a voltage-to-ground detector, wherein the voltage detection end is configured to connect to the voltage-to-ground detector, and the voltage-to-ground detector is configured to:

when one grid-connected switch is turned off, detect a voltage to ground of the voltage detection end to obtain a first voltage value; and when the at least one grid-connected switch is turned on, detect a voltage to ground of the voltage detection end to obtain a second voltage value; and the controller is configured to:

output alarm information for grounding of a neutral wire of the transformer; or control the power conditioning apparatus to stop working when a difference between the second voltage value and the first voltage value falls within a preset voltage range.

* * * * *